US 9,068,483 B2

(12) United States Patent
Nakamura

(10) Patent No.: US 9,068,483 B2
(45) Date of Patent: Jun. 30, 2015

(54) VARIABLE VALVE ACTUATING APPARATUS FOR INTERNAL COMBUSTION ENGINE, AND CONTROLLER FOR VARIABLE VALVE ACTUATING APPARATUS

(75) Inventor: Makoto Nakamura, Zushi (JP)

(73) Assignee: HITACHI AUTOMOTIVE SYSTEMS, LTD., Hitachinaka-shi (JP)

( * ) Notice: Subject to any disclaimer, the term of this patent is extended or adjusted under 35 U.S.C. 154(b) by 508 days.

(21) Appl. No.: 13/418,378

(22) Filed: Mar. 13, 2012

(65) Prior Publication Data

US 2012/0266833 A1 Oct. 25, 2012

(30) Foreign Application Priority Data

Apr. 21, 2011 (JP) .................................. 2011-094705

(51) Int. Cl.
| | |
|---|---|
| F02D 13/04 | (2006.01) |
| F01L 1/344 | (2006.01) |
| F01L 13/00 | (2006.01) |
| F02D 13/02 | (2006.01) |

(52) U.S. Cl.
CPC ........... *F01L 1/3442* (2013.01); *F01L 13/0026* (2013.01); *F01L 2001/34453* (2013.01); *F01L 2001/34483* (2013.01); *F02D 13/0211* (2013.01); *F02D 13/0219* (2013.01); *F02D 13/0246* (2013.01); *F02D 13/0261* (2013.01); *F02D 13/0265* (2013.01); *F02D 2013/0292* (2013.01); *Y02T 10/18* (2013.01)

(58) Field of Classification Search
CPC ............... F01L 13/065; F01L 2800/08; F02D 2014/001
USPC .............. 123/321, 322, 345–348, 90.1, 90.15
See application file for complete search history.

(56) References Cited

U.S. PATENT DOCUMENTS

| 7,290,524 | B2 * | 11/2007 | Kobayashi | ..................... | 123/315 |
|---|---|---|---|---|---|
| 7,779,796 | B2 * | 8/2010 | Nakamura | ................. | 123/90.15 |
| 8,061,311 | B2 * | 11/2011 | Nakamura | ................. | 123/90.16 |
| 8,447,500 | B2 * | 5/2013 | Suzuki et al. | ................. | 701/105 |
| 2007/0144470 | A1 * | 6/2007 | Murase et al. | ............. | 123/90.15 |
| 2010/0217504 | A1 * | 8/2010 | Fujii et al. | ..................... | 701/105 |

FOREIGN PATENT DOCUMENTS

| JP | 2005-337110 | 12/2005 |
|---|---|---|
| JP | 2011-021570 | 2/2011 |

OTHER PUBLICATIONS

JP Office Action for Japanese Application No. 2011-094705, issued on Feb. 25, 2014.

* cited by examiner

*Primary Examiner* — John Kwon
(74) *Attorney, Agent, or Firm* — Foley & Lardner LLP

(57) ABSTRACT

A multi-cylinder internal combustion engine is provided with a variable valve actuating system. At a startup of the engine, a controller performs: causing an initial exhaust valve opening timing of a first combustion cylinder to approach bottom dead center; and setting a second valve overlap period greater than a first valve overlap period, wherein the first valve overlap period is a period from an initial intake valve opening timing of the first combustion cylinder to an initial exhaust valve closing timing of the first combustion cylinder, and wherein the second valve overlap period is a period from an initial intake valve opening timing of a second combustion cylinder to an initial exhaust valve closing timing of the second combustion cylinder immediately after an initial combustion event of the second combustion cylinder after an initial combustion event of the first combustion cylinder.

27 Claims, 15 Drawing Sheets

VARIABLE VALVE ACTUATING APPARATUS FOR INTERNAL COMBUSTION ENGINE, AND CONTROLLER FOR VARIABLE VALVE ACTUATING APPARATUS

BACKGROUND OF THE INVENTION

The present invention relates to variable valve actuating apparatuses or systems for controlling opening and closing timings of intake valves and/or exhaust valves of internal combustion engines, and controllers for variable valve actuating systems.

Japanese Patent Application Publication No. 2005-337110 discloses a variable valve actuating system for a multi-cylinder internal combustion engine. The variable valve actuating system is configured to retard an exhaust valve opening timing of a first cylinder, wherein the first cylinder undergoes an initial combustion event at an automatic startup of the engine earlier than any other cylinder of the engine, and wherein the exhaust valve opening timing is an initial one immediately after the initial combustion event of the first cylinder. This feature is intended to effectively convert combustion pressure of the initial combustion event of the first cylinder on expansion stroke into a crank torque applied to a crankshaft, and thereby quickly start the engine.

SUMMARY OF THE INVENTION

The variable valve actuating system of Japanese Patent Application Publication No. 2005-337110 is configured to set immediately after the initial combustion event of the first cylinder at the startup of the engine the exhaust valve opening timings of the other cylinders advanced as usual so that valve operation of each cylinder other than the first cylinder has a little or zero valve overlap period. This adversely affects emission reduction performance of the engine in such situations.

In view of the foregoing, it is desirable to provide a variable valve actuating system for a multi-cylinder internal combustion engine and a controller for a variable valve actuating system which can enhance both of the startability and emission reduction performance of the engine in balance.

According to one aspect of the present invention, a controller for controlling a variable valve actuating apparatus for a multi-cylinder internal combustion engine, wherein the engine includes at least a first cylinder and a second cylinder, the controller comprises: a section programmed to perform a control process in response to a precondition that the first cylinder undergoes an initial combustion event at a startup of the engine earlier than any other cylinder of the engine, the control process including: a first operation of causing an exhaust valve opening timing of the first cylinder to approach bottom dead center, wherein the exhaust valve opening timing is an initial one immediately after the initial combustion event of the first cylinder; and a second operation of setting a second valve overlap period greater than a first valve overlap period, wherein the first valve overlap period is a period from an initial intake valve opening timing of the first cylinder to an initial exhaust valve closing timing of the first cylinder immediately after the initial combustion event of the first cylinder, and wherein the second valve overlap period is a period from an initial intake valve opening timing of the second cylinder to an initial exhaust valve closing timing of the second cylinder immediately after an initial combustion event of the second cylinder after the initial combustion event of the first cylinder.

According to another aspect of the present invention, a controller for controlling a variable valve actuating apparatus for a multi-cylinder internal combustion engine, wherein the engine includes at least a first cylinder and a second cylinder, the controller comprises: a section programmed to perform a control process in response to a precondition that the first cylinder undergoes an initial combustion event at a startup of the engine earlier than any other cylinder of the engine, the control process including: a first operation of retarding an exhaust valve opening timing of the first cylinder, wherein the exhaust valve opening timing is an initial one immediately after the initial combustion event; and a second operation of allowing exhaust gas to flow into an intake-side part of the engine, wherein the exhaust gas is produced by an initial combustion event of the second cylinder after the initial combustion event of the first cylinder.

According to a further aspect of the present invention, a variable valve actuating apparatus for a multi-cylinder internal combustion engine, wherein the engine includes at least a first cylinder and a second cylinder, the variable valve actuating apparatus comprises: a section configured to perform a process in response to a precondition that the first cylinder undergoes an initial combustion event at a startup of the engine earlier than any other cylinder of the engine, the process including: a first operation of causing an exhaust valve opening timing of the first cylinder to approach bottom dead center, wherein the exhaust valve opening timing is an initial one immediately after the initial combustion event of the first cylinder; and a second operation of setting a second valve overlap period greater than a first valve overlap period, wherein the first valve overlap period is a period from an initial intake valve opening timing of the first cylinder to an initial exhaust valve closing timing of the first cylinder immediately after the initial combustion event of the first cylinder, and wherein the second valve overlap period is a period from an initial intake valve opening timing of the second cylinder to an initial exhaust valve closing timing of the second cylinder immediately after an initial combustion event of the second cylinder after the initial combustion event of the first cylinder.

BRIEF DESCRIPTION OF THE DRAWINGS

FIG. 5A shows a condition in which the drive mechanism is controlled to be in a state of minimum valve lift, and FIG. 5B shows a condition in which the drive mechanism is controlled to be in a state of maximum valve lift.

FIG. 7A shows a condition that the exhaust valve timing varying mechanism is controlled to be in a most retarded state, and FIG. 7B shows a condition that the exhaust valve timing varying mechanism is controlled to be in a most advanced state.

DETAILED DESCRIPTION OF THE INVENTION

Figure 1:
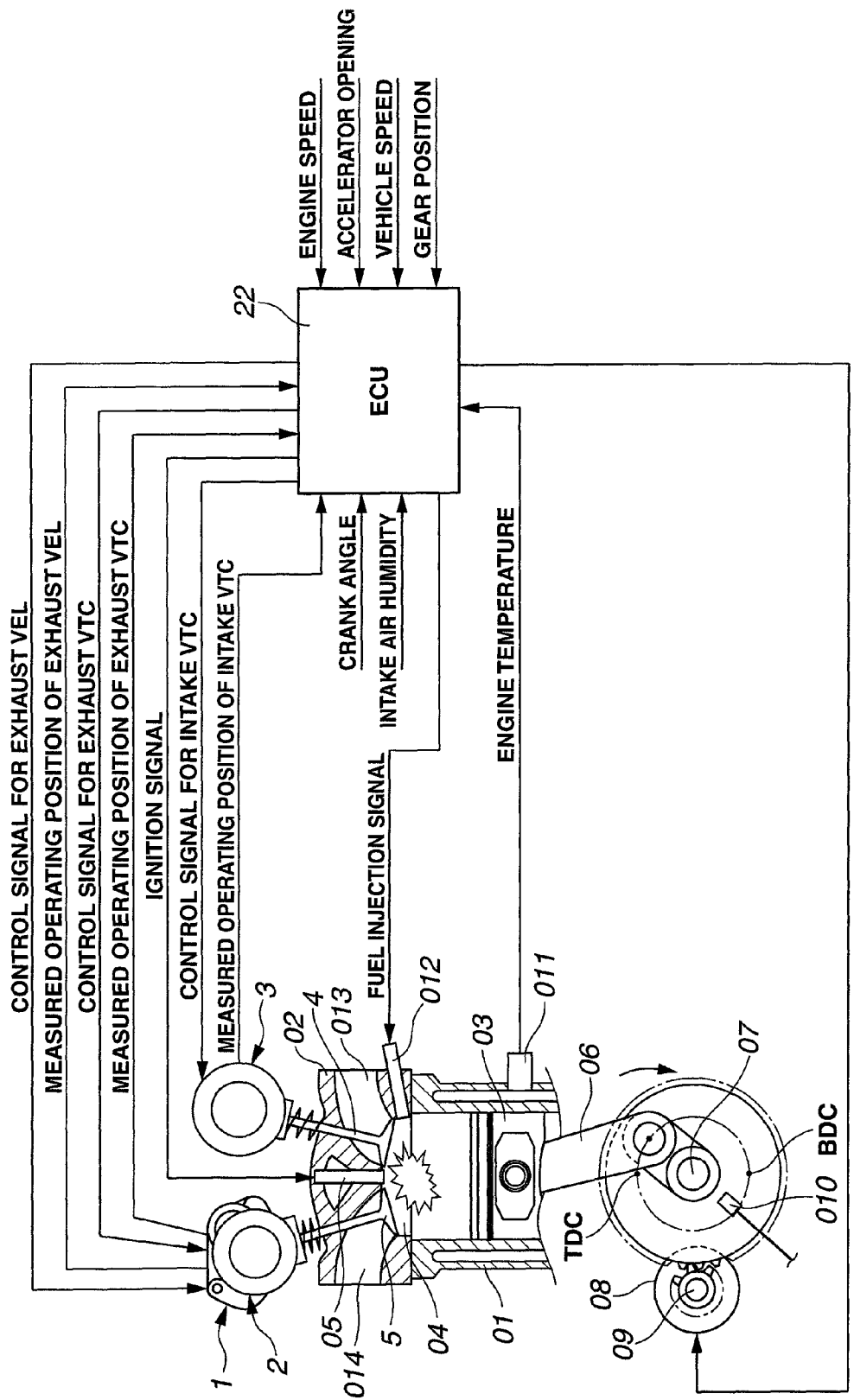
FIG. 1 is a schematic diagram showing an internal combustion engine system including a variable valve actuating system or apparatus according to first and second embodiments of the present invention.

FIG. 1 schematically shows an internal combustion engine system including a variable valve actuating system or apparatus according to first and second embodiments of the present invention. In these embodiments, the internal combustion engine system includes a four-cycle spark-ignition four-cylinder gasoline internal combustion engine, and is provided with an idle stop function of automatically stop and start the engine independently of operator's intention. As shown in FIG. 1, the engine includes a cylinder block 01, a cylinder head 02, and four cylinders. Each cylinder includes a piston 03, and an ignition plug 05, where a combustion chamber 04 is defined between cylinder head 02 and piston 03 in a cylinder bore formed in cylinder block 01. Ignition plug 05 is mounted in cylinder head 02, and located substantially at the center of combustion chamber 04. Piston 03 is linked with a crankshaft 07 through a piston pin not shown and a connecting rod 06, wherein connecting rod 06 has a longitudinal end connected to the piston pin and another longitudinal end connected to crankshaft 07.

Crankshaft 07 is configured to be driven by a crank torque generated by a drive motor 09 and transmitted by a pinion gear mechanism 08, when the engine is normally started up from a cold state, and when the engine is automatically started after an idle stop condition. Crankshaft 07 is provided with a crank angle sensor 010 for measuring the crank angle and rotational speed of crankshaft 07.

Cylinder block 01 is provided with a coolant temperature sensor 011 for measuring the temperature of engine coolant flowing in a water jacket. Cylinder head 02 is provided with a fuel injection valve 012 for injecting fuel directly into combustion chamber 04.

In cylinder head 02, an intake port 013 and an exhaust port 014 are formed. Cylinder head 02 is provided with two intake valves 4, 4 and two exhaust valves 5, 5 per one cylinder which are slidably mounted for opening and closing respective ones of intake port 013 and exhaust port 014.

Figure 2:
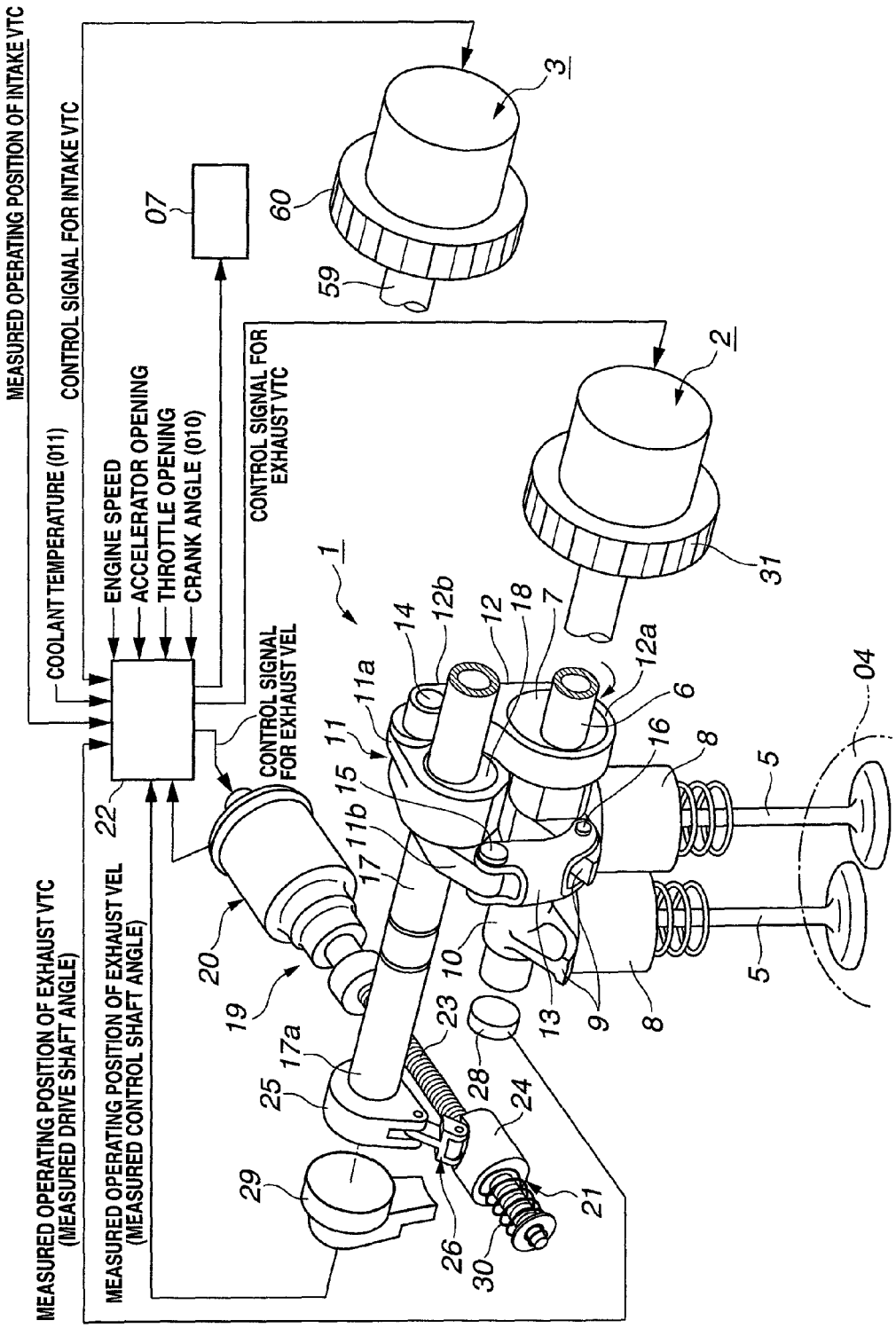
FIG. 2 is a schematic diagram showing a perspective view of an exhaust valve operating angle varying mechanism, an exhaust valve timing varying mechanism, and an intake valve timing varying mechanism in the variable valve actuating system according to the first embodiment.

As shown in FIGS. 1 and 2, the variable valve actuating system includes an exhaust valve operating angle varying mechanism (exhaust valve lift varying mechanism, exhaust valve event and lift varying mechanism, or exhaust VEL) 1 as a first valve actuating mechanism for continuously varying (increasing or reducing) the lift and operating angle (operating period, or period when a valve is open) of exhaust valves 5, and an exhaust valve timing varying mechanism (exhaust valve phase varying mechanism, exhaust valve timing control mechanism, or exhaust VTC) 2 as a second valve actuating mechanism for continuously varying (advancing or retarding) a phase (lift phase, or maximum lift phase) of exhaust valves 5 so as to vary (advance or retard) the opening and closing timings of exhaust valves 5 (an exhaust valve opening timing EO and an exhaust valve closing timing EC), while holding constant the operating angle of exhaust valves 5. The variable valve actuating system further includes an intake valve timing varying mechanism (intake valve phase varying mechanism, intake valve timing control mechanism, or intake VTC) 3 as a third valve actuating mechanism for continuously varying (advancing or retarding) a phase (lift phase, or maximum lift phase) of intake valves 4 so as to vary (advance or retard) the opening and closing timings of intake valves 4 (an intake valve opening timing IO and an intake valve closing timing IC), while holding constant the operating angle of intake valves 4. Operation of the exhaust VEL 1, exhaust VTC 2, and intake VTC 3 is controlled by a controller 22 according to engine operating state, as described in detail below.

Figure 3A:
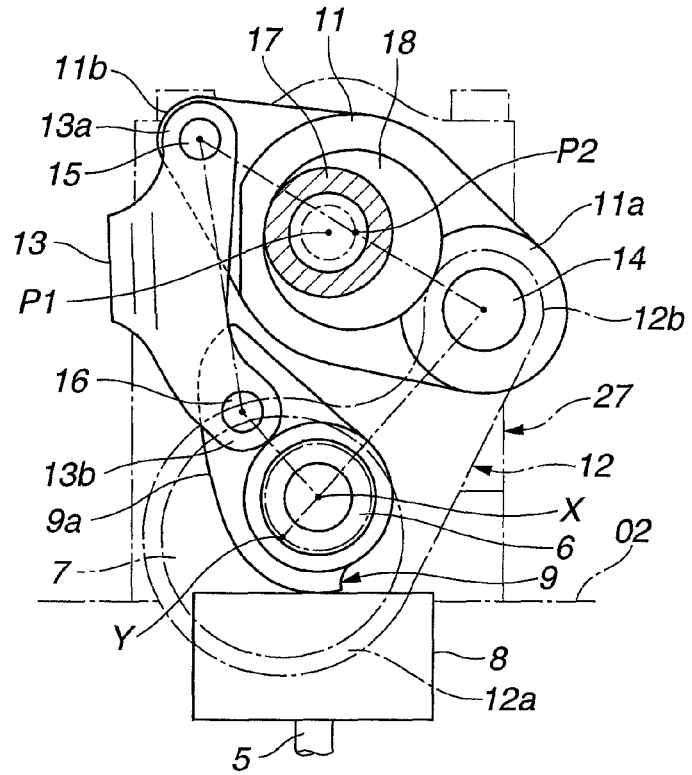
FIGS. 3A and 3B are diagrams illustrating how the exhaust valve operating angle varying mechanism operates when controlled to be in a state of small valve lift.

The exhaust VEL 1 has a construction similar to that of a corresponding device adapted to intake valves in Japanese Patent Application Publication No. 2003-172112. As shown in FIGS. 2 and 3A, the exhaust VEL 1 includes a hollow drive shaft 6 which is rotatably supported by a bearing 27 on an upper part of cylinder head 02; a rotating cam 7 which is an eccentric rotary cam fixedly mounted on drive shaft 6 by press fitting in this example; a pair of swing cams 9 which are swingably mounted on drive shaft 6, and arranged to open the exhaust valves 5, respectively, by sliding on top surfaces of valve lifters 8 provided in the upper ends of exhaust valves 5; and a linkage or motion transmitting mechanism arranged to transmit rotation of rotating cam 7 to swing cams 9 for swing motion.

Drive shaft 6 is arranged to receive rotation from crankshaft 07 through a rotation transmitting mechanism which, in this example, is a chain drive including a timing sprocket 31 provided on one end of drive shaft 6, a driving sprocket provided on crankshaft 07, and a timing chain not shown. When driven by crankshaft 07, the drive shaft 6 rotates in the clockwise direction as shown by an arrow in FIG. 2.

Rotating cam 7 is shaped like a ring, and formed with a drive shaft receiving hole extending in the axial direction of rotating cam 7. Rotating cam 7 is fixedly mounted on drive shaft 6 extending through the drive shaft receiving hole. The central axis Y of rotating cam 7 is offset in the radial direction from the central axis X of drive shaft 6 by a predetermined distance.

As shown in FIGS. 2 and 3A, swing cams 9 are formed integrally at both ends of an annular camshaft 10. Camshaft 10 is hollow and rotatably mounted on drive shaft 6. Each swing cam 9 has a lower surface including a cam surface 9a. Cam surface 9a includes a base circle surface region on the cam shaft's side, a ramp surface region extending like a circular arc from the base circle surface region toward a cam nose, and a lift surface region extending from the ramp surface region toward an apex of the cam nose. The cam surface 9a abuts on the top surface of the corresponding valve lifter 8 at a predetermined position, and the contact point of the cam surface 9a shifts among the base circle surface region, ramp surface region and lift surface region in dependence on the swing position of the swing cam 9.

The above-mentioned linkage or motion transmitting mechanism includes a rocker arm 11 disposed above drive shaft 6; a link arm 12 connecting a first end portion 11a of rocker arm 11 with rotating cam 7; and a link rod 13 connecting a second end portion 11b of rocker arm 11 with one swing cam 9.

Rocker arm 11 includes a tubular central base portion formed with a support hole, and rotatably mounted on a control cam 18 through the support hole. The first end portion 11a of rocker arm 11 is connected rotatably with link arm 12 by a pin 14, and the second end portion 11b is connected rotatably with a first end portion 13a of link rod 13 by a pin 15.

Link arm 12 includes a relatively large annular base portion 12a and a projection 12b projecting outward from the base portion 12a. Base portion 12a is formed with a center hole in which the cam portion of the rotating cam 7 is rotatably fit. The projection 12b is connected rotatably with the first end portion 11a of rocker arm 11 by pin 14.

Link rod 13 includes a second end 13b which is connected rotatably with the cam nose of swing cam 9 by a pin 16.

Control shaft 17 extends in parallel to drive shaft 6 in the longitudinal direction of the engine, and is rotatably supported by the same bearings at a position just above drive shaft 6. Control cam 18 is fixedly mounted on control shaft 17 and fit slidably in the support hole of rocker arm 11 to serve as a fulcrum for the swing motion of rocker arm 11. Control cam 18 is shaped like a hollow cylinder, and the central axis P2 of control cam 18 is offset from the central axis P1 of the control shaft 17 by a predetermined distance. Rotation of control shaft 17 is controlled by a drive mechanism 19.

Figure 5A:
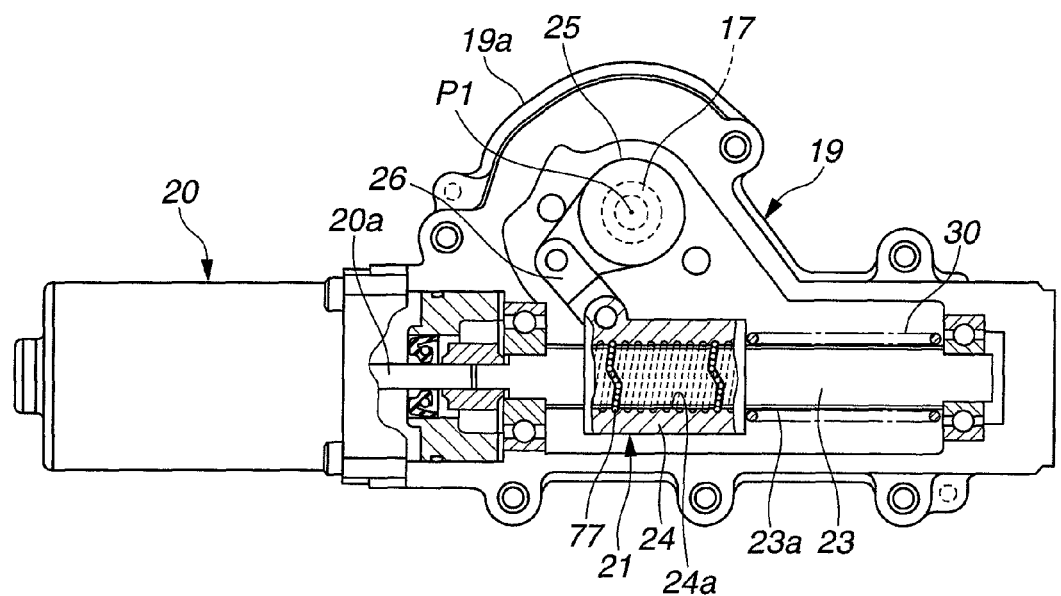
FIGS. 5A and 5B are diagrams showing cross-sectional views of a drive mechanism of the exhaust valve operating angle varying mechanism, where
Figure 5B:
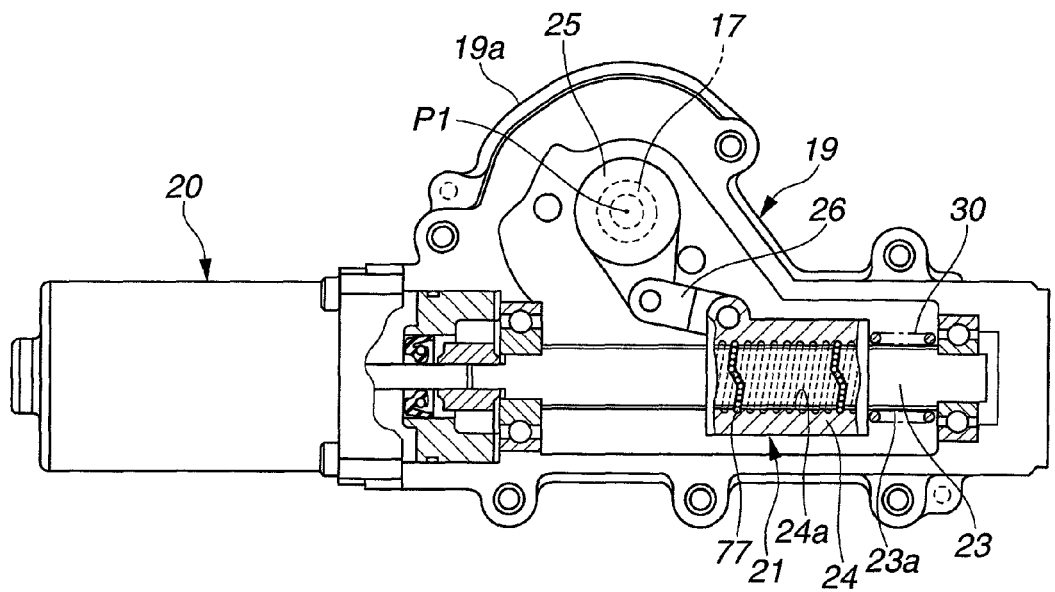

As shown in FIGS. 5A and 5B, drive mechanism 19 includes an electric motor 20 which is fixed to one end of a casing 19a; and a transmission mechanism 21 housed in casing 19a and configured to transmit rotation of the electric motor 20 to the control shaft 17. In this example, the transmission mechanism 21 is a ball screw transmission mechanism.

Electric motor 20 of this example is a proportional type DC motor. Electric motor 20 is controlled by controller 22 in accordance with a measured operating state of the engine.

Ball screw transmission mechanism 21 includes a ball screw shaft 23, a ball nut 24, a connection arm 25 and a link member 26. Ball screw shaft 23 and a drive shaft 20a of electric motor 20 are arranged end to end and aligned with each other so that their axes form a substantially straight line. Ball nut 24 serves as a movable nut screwed on the ball screw shaft 23 and arranged to move axially in accordance with the rotation. Connection arm 25 is connected with one end portion of control shaft 17. Link member 26 links the connection arm 25 and ball nut 24.

Ball screw shaft 23 is formed with an external single continuous ball circulating groove 23a extending, in the form of a helical thread, over the outside surface of ball screw shaft 23. Ball screw shaft 23 and the drive shaft of electric motor 20 are connected end to end by a coupling member which transmits a rotational driving force from electric motor 20 to ball screw shaft 23. Ball nut 24 is approximately in the form of a hollow cylinder. Ball nut 24 is formed with an internal guide groove 24a designed to hold a plurality of balls in cooperation with the ball circulating groove 23a of ball screw shaft 23 so that balls 77 can roll between the guide groove and the circulating groove. This guide groove is a single continuous helical thread formed in the inside circumferential surface of ball nut 24. Ball nut 24 is arranged to translate the rotation of ball screw shaft 23 into a linear motion of ball nut 24 and produce an axial force.

A coil spring 30 as a biasing device is disposed around ball screw shaft 23 between ball nut 24 and a spring seat provided at the tip of ball screw shaft 23, so as to urge the ball nut 24 axially toward electric motor 20. It is to be understood from the following description that coil spring 30 serves to bias the ball nut 24 in the direction to reduce the lift and operating angle of exhaust valves 5. Accordingly, when the engine is stopped or at rest, then ball nut 24 is moved along ball screw shaft 23 toward a position for a minimum lift and minimum operating angle of exhaust valves 5 by the elastic force of the coil spring 30.

Controller 22 of this example is a common control unit or control section used for controlling all of the exhaust VEL 1, the exhaust VTC 2, and the intake VTC 3. Controller 22 is built in an engine control unit (ECU). Controller 22 is connected with various sensors to collect information on an operating state of the engine. Controller 22 receives data signals outputted from the sensors, and identifies the engine operating state on the basis of the data signals. The sensors include the crank angle sensor 010 for sensing the rotation angle of crankshaft 07 and sensing an engine speed N (rpm), an accelerator opening sensor, a vehicle speed sensor, a gear position sensor, the coolant temperature sensor 011, a drive shaft angle sensor 28 for sensing the rotation angle of drive shaft 6, and a potentiometer (control shaft angle sensor) 29 for sensing the rotation angle of control shaft 17. Controller 22 measures the relative rotational position between timing sprocket 31 and drive shaft 6, and the lift and operating angle of exhaust valves 5, on the basis of the data signals from crank angle sensor 010, drive shaft angle sensor 28, and potentiometer 29.

Figure 3B:
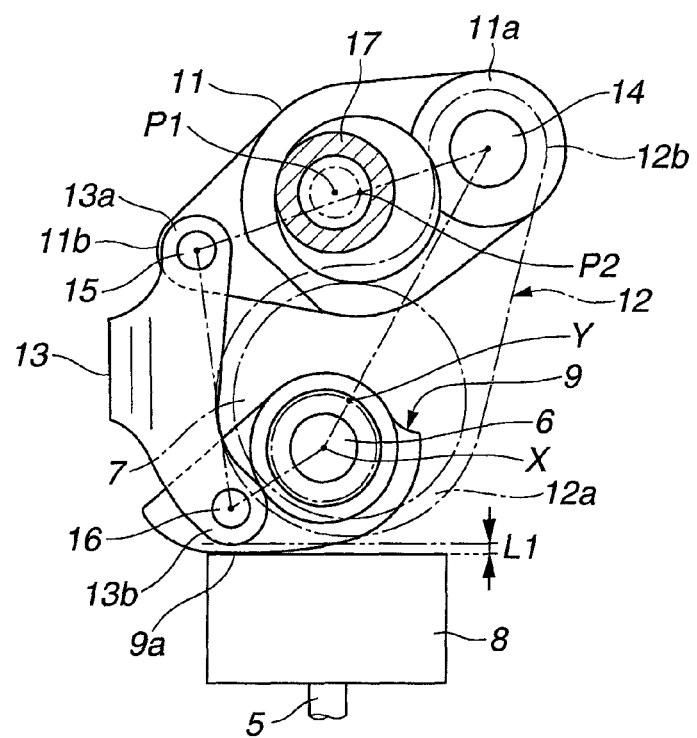

The thus-constructed exhaust VEL 1 is controlled to operate as follows. When the engine is operating in a predetermined engine operating region, the controller 22 acts to move the ball nut 24 rectilinearly toward electric motor 20 as shown in FIG. 5A, by sending a control current to electric motor 20 and rotating the ball screw shaft 23 with electric motor 20. The movement of ball nut 24 is assisted by the elastic force of coil spring 30. With this movement of ball nut 24, the control shaft 17 is rotated in one direction by the link member 26 and connection arm 25. Accordingly, control cam 18 rotates about the axis of control shaft 17 so that the axis of control cam 18 rotates about the axis of control shaft 17, as shown in FIGS. 3A and 3B (in the form of front view), and a thick wall portion of control cam 18 is shifted upwards from drive shaft 6. As a result, the pivot point between the second end portion 11b of rocker arm 11 and link rod 13 is shifted upwards relative to the drive shaft 6. Therefore, each swing cam 9 is rotated in the clockwise direction as viewed in FIGS. 3A and 3B, and the cam nose is pulled upwards by link rod 13. Accordingly, rotating cam 7 rotates and pushes up the first end portion 11a of rocker arm 11 through link arm 12. Though a movement for valve lift is transmitted through link rod 13 to swing cam 9 and valve lifter 8, the valve lift is decreased sufficiently to a small lift L1 shown by a valve lift curve in FIG. 6, and the operating angle (or valve opening period from exhaust valve opening timing to exhaust valve closing timing in which exhaust valves 5 are lifted to open the intake port 013) D is decreased to a small value D1.

When the engine is operating in another predetermined engine operating region, the controller 22 drives electric motor 20 in a reverse rotational direction, and thereby rotates the ball screw shaft 23 in the reverse direction. With this reverse rotation of ball screw shaft 23, the ball nut 24 moves against the elastic force of coil spring 30 by a predetermined distance in the axial direction away from electric motor 20, i.e., in the rightward direction in FIG. 5A, and control shaft 17 is rotated in the clockwise direction as viewed in FIGS. 3A and 3B by a predetermined amount. Therefore, the control cam 18 is held at the angular position at which the central axis P2 of control cam 18 is shifted downward by a predetermined amount from the central axis P1 of control shaft 17, and the thick wall portion of control cam 18 is shifted downwards. Rocker arm 11 is moved in the counterclockwise direction from the position of FIGS. 3A and 3B, and the end of rocker arm 11 pushes down the cam nose of swing cam 9 through link member 13, and swing cam 9 rotates in the counterclockwise direction slightly. Accordingly, rotating cam 7 rotates and pushes up the end 11a of rocker arm 11 through link arm 12. A movement for valve lift is transmitted through link member 13 to swing cams 9 and valve lifters 8. In this case, the valve lift is increased to a medium lift L2 or a large lift L3, and the operating angle is increased to a medium angle D2 or a large angle D3.

Figure 4A:
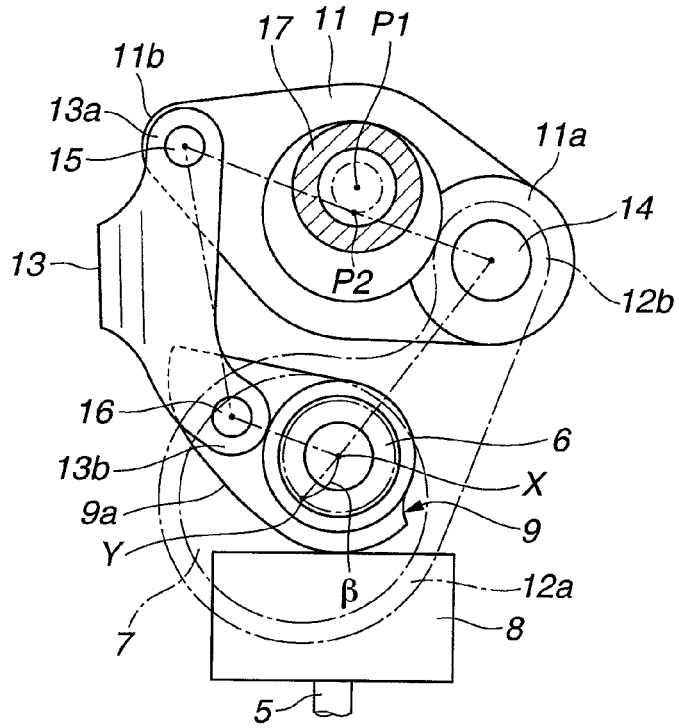
FIGS. 4A and 4B are diagrams illustrating how the exhaust valve operating angle varying mechanism operates when controlled to be in a state of maximum valve lift.
Figure 4B:
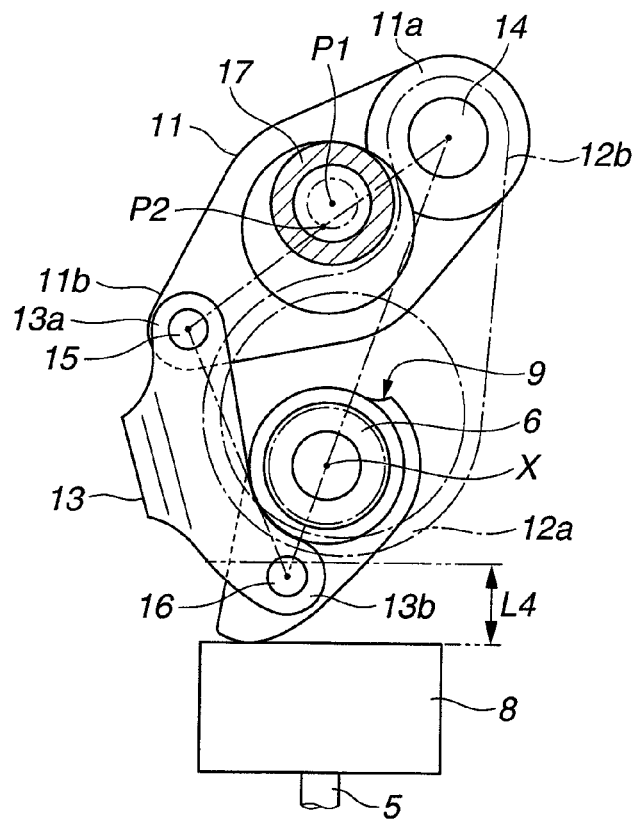
Figure 6:
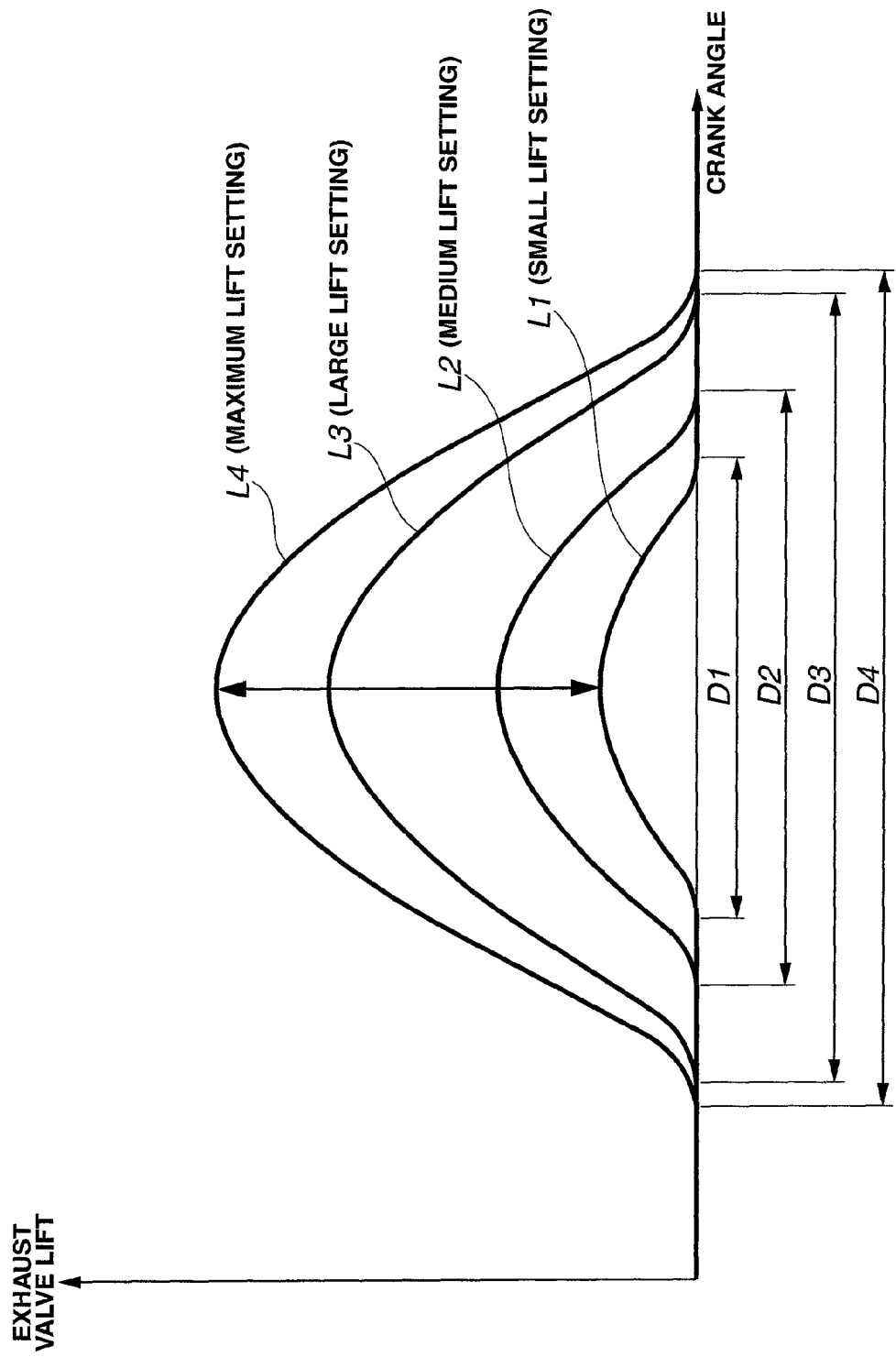
FIG. 6 is a graphic diagram showing how the lift and operating angle of each exhaust valve of the engine are controlled by the variable valve actuating system.

When the engine operating point enters a high speed and high load region, this variable valve actuating system can rotate electric motor 20 in the reverse direction by sending the control signal from controller 22, to move ball nut 24 maximally in the rightward direction as shown in FIG. 5B, and thereby rotate control cam 18 further in the clockwise direction with control shaft 17 to the position at which the central axis P2 is rotated downwards as shown in FIGS. 4A and 4B. Therefore, rocker arm 11 moves to a position closer to the drive shaft 6, and the second end 11b pushes down the cam nose of swing cam 9 through link rod 13, so that the swing cam 9 is further rotated in the counterclockwise direction by a predetermined amount. Accordingly, rotating cam 7 rotates and pushes up the first end 11a of rocker arm 11 through link arm 12. A movement for valve lift is transmitted through link rod 13 to swing cam 9 and valve lifter 8. In this case, the valve lift is increased continuously from L2, L3 to L4 as shown in FIG. 6. In this way, this system can improve the exhaust efficiency and thereby improve the engine output in the high speed region.

In this way, the exhaust VEL 1 varies the lift of exhaust valves 5 continuously from the small lift L1 through the medium lift L2 and large lift L3 to the maximum lift L4, and also varies the operating angle of exhaust valves 5 continuously from the small angle D1 to the maximum angle D4.

When the engine is at rest, the ball nut 24 is mechanically moved toward electric motor 20 and stably held in the position for small lift L1 and small operating angle D1 (default operating position) by the elastic force of coil spring 30.

Figure 7A:
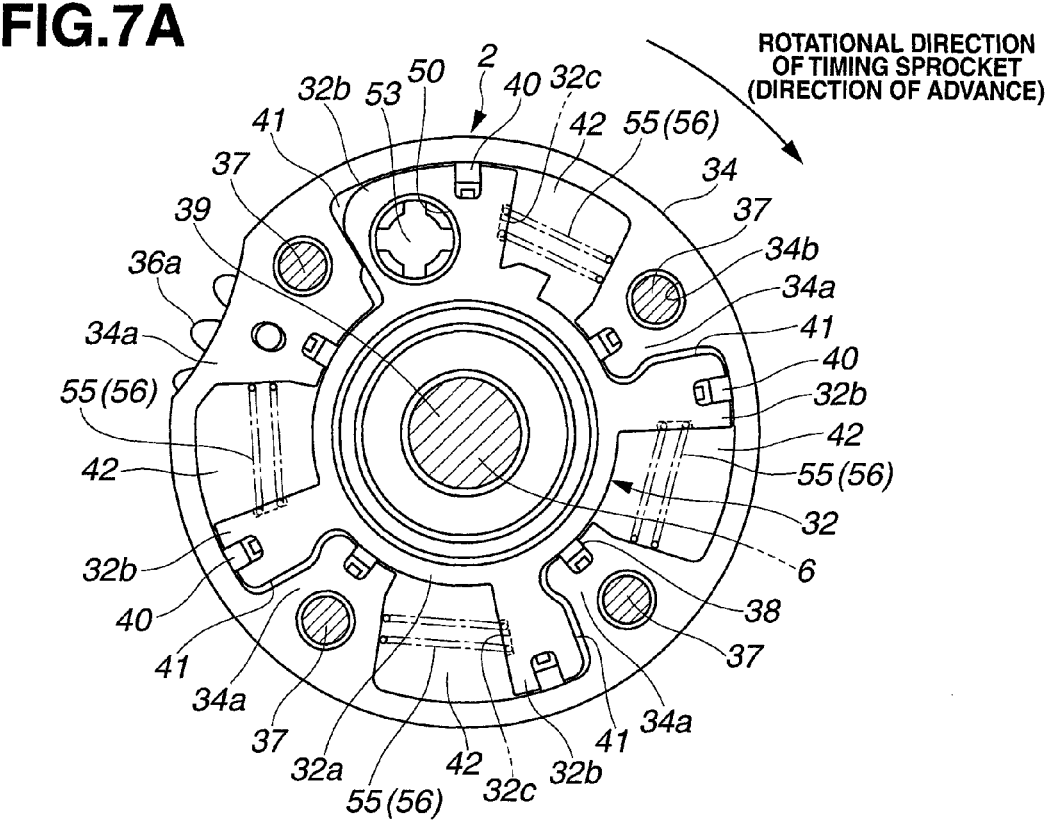
FIGS. 7A and 7B are cross-sectional views of the exhaust valve timing varying mechanism taken along a plane indicated by a line A-A shown in FIG. 8, where
Figure 7B:
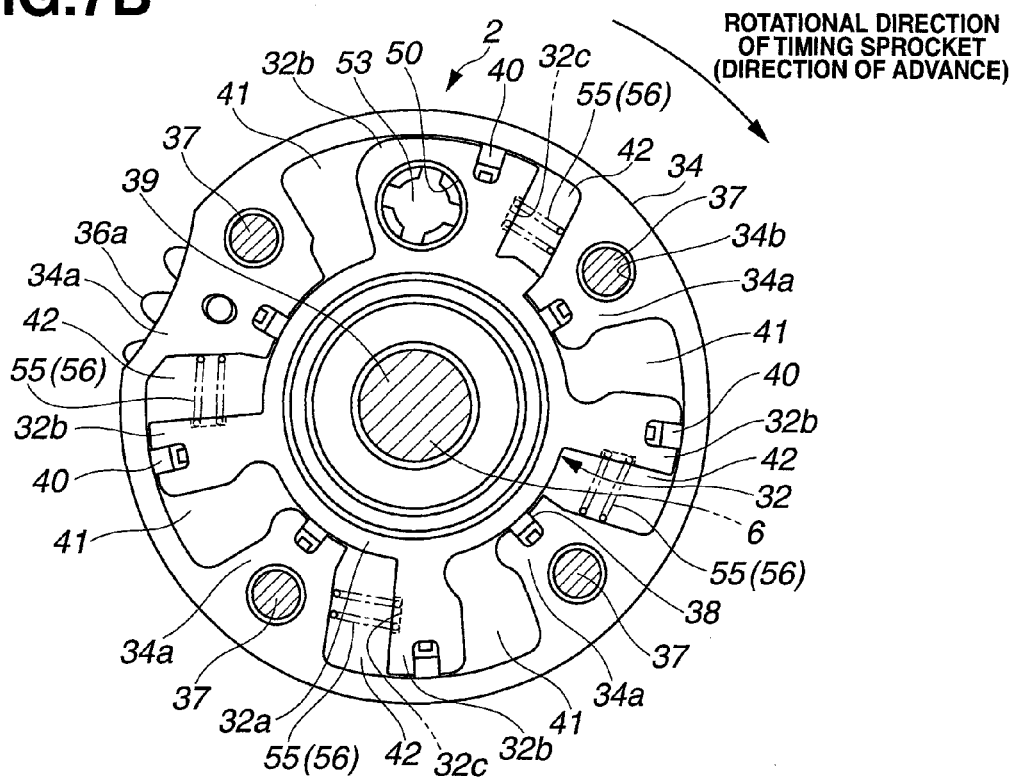
Figure 8:
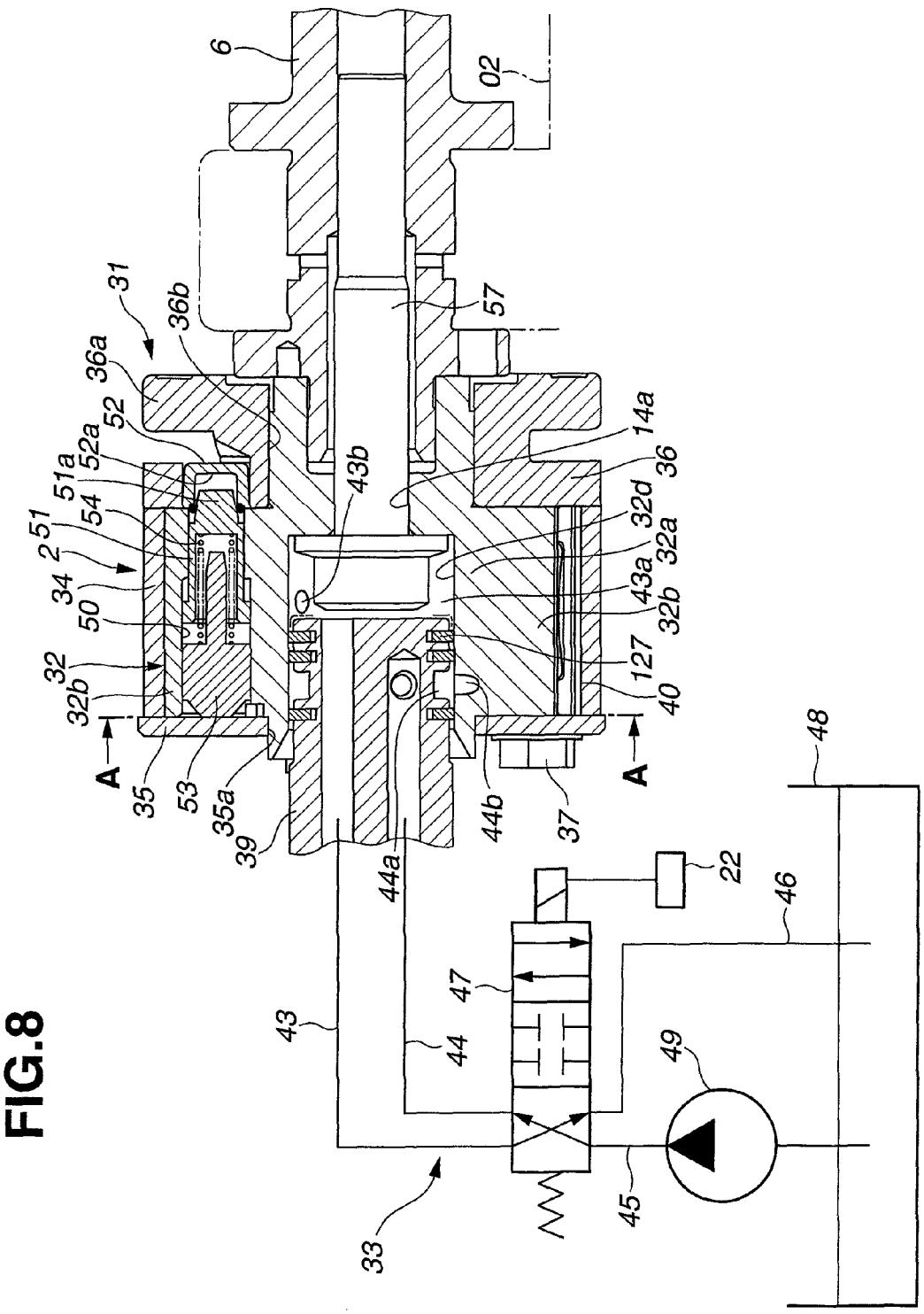
FIG. 8 is a cross-sectional view of the exhaust valve timing varying mechanism taken along a plane passing through a longitudinal axis of the exhaust valve timing varying mechanism.

As shown in FIGS. 7A, 7B and 8, the exhaust VTC 2 of this example is a vane type mechanism including the timing sprocket 31 for transmitting rotation to drive shaft 6 from engine crankshaft 07; a vane member 32 as a movable member which is fixed to one end of drive shaft 6 and received rotatably in the timing sprocket 31; and a hydraulic circuit to rotate the vane member 32 in the forward and reverse directions by the use of an oil pressure.

Timing sprocket 31 includes a housing 34 receiving the vane member 32 rotatably; a front cover 35 shaped like a circular disk and arranged to close a front opening of housing 34; and a rear cover 36 shaped approximately like a circular disk and arranged to close a rear opening of housing 34. Housing 34 is sandwiched between front and rear covers 35 and 36, and joined with these covers to form a unit, by four small diameter bolts 37 extending in the axial direction of drive shaft 6. Housing 34 thus rotates in synchronization with crankshaft 07.

Housing 34 is in the form of a hollow cylinder having the front and rear openings. Housing 34 includes a plurality of shoes 34a projecting radially inwards from the inside circumferential surface and serving as a partition. In this example, four of the shoes 34a are arranged at intervals of about 90 degrees.

Each shoe 34a has an approximately trapezoidal cross section. A bolt hole 34b is formed approximately at the center of each shoe 34a. Each bolt hole 34b passes axially through one of shoes 34a, and receives the shank of one of the axially extending bolts 37. Each shoe 34a includes an inner end surface. A retaining groove extends axially in the form of cutout in the inner end surface of each shoe 34a at a higher position. A U-shaped seal member 38 is fit in each retaining groove, and urged radially inwards by a leaf spring not shown fit in the retaining groove.

Front cover 35 includes a center support hole 35a having a relatively large inside diameter; and four bolt holes not shown each receiving one of the axially extending bolts 37. These four bolt holes are arranged around the center support hole 35a, facing respective ones of the bolt holes 34b of shoes 34a.

Rear cover 36 includes a toothed portion 36a formed integrally on the rear side, and arranged to engage with the before-mentioned timing chain; and a center bearing hole 36b having a relatively large inside diameter and extending axially through rear cover 36.

Vane member 32 includes a central vane rotor 32a and a plurality of vanes 32b projecting radially outwards from the vane rotor 32a. In this example, four of the vanes 32b are arranged at angular intervals of approximately 90 degrees circumferentially around vane rotor 32a. Vane rotor 32a is annular and includes a center bolt hole 14a at the center. Vanes 32b are integral with vane rotor 32a. Vane member 32 is fixed to the front end of drive shaft 6 by a fixing bolt 57 extending axially through the center bolt hole 14a of vane rotor 32a.

The vane rotor 32a includes a front side small diameter tubular portion supported rotatably by the center support hole 35a of front cover 35, and a rear side small diameter tubular portion supported rotatably by the bearing hole 36b of rear cover 36.

Three of the four vanes 32b are smaller vanes shaped approximately like a relatively long rectangle, and the remaining one is a larger vane shaped like a relatively large trapezoid. The smaller vanes 32b are approximately equal in circumferential width whereas the larger vane 32b has a larger circumferential width greater than that of each of the smaller vanes 32b so that a weight balance is attained as a whole of vane member 32. The four vanes 32b of vane member 32 and the four shoes 34a of housing 34 are arranged alternately in the circumferential direction around the center axis, as shown in FIGS. 7A and 7B. Each vane 32b includes an axially extending retaining groove receiving a U-shaped seal member 40 in sliding contact with the inside cylindrical surface of housing 34, and a leaf spring not shown for urging the seal member 40 radially outwards and thereby pressing the seal member 40 to the inside cylindrical surface of housing 34. Moreover, in one side of each vane 32b facing in the direction opposite to the rotational direction of drive shaft 6, there are formed two circular recesses 32c.

An advance fluid pressure chamber 41 and a retard fluid pressure chamber 42 are formed on both sides of each vane 32b. Accordingly, there are four of the advance fluid pressure chambers 41 and four of the retard fluid pressure chambers 42.

As shown in FIG. 8, the hydraulic circuit includes a first fluid passage 43 leading to the advance fluid pressure chambers 41 to supply and drain an advance fluid pressure of an operating oil to and from advance fluid pressure chambers 41; a second fluid passage 44 leading to the retard fluid pressure chambers 42 to supply and drain a retard fluid pressure of the operating oil to and from retard fluid pressure chambers 42; and a directional control valve or selector valve 47 connecting the first fluid passage 43 and second fluid passage 44 selectively with a supply passage 45 and a drain passage 46. A fluid pump 49 is connected with supply passage 45, and arranged to draw the hydraulic operating fluid or brake fluid or oil from an oil pan 48 of the engine, and to force the fluid into supply passage 45. Pump 49 is a one-way type pump. The downstream end of drain passage 46 is connected to oil pan 48, and arranged to drain the fluid to oil pan 48.

First and second fluid passages 43 and 44 include sections formed in a cylindrical portion 39 which is inserted, from a first end, through the small diameter tubular portion of vane rotor 32a, into the support hole 32d of vane rotor 32a. A second end of the cylindrical portion 39 is connected with directional control valve 47.

Between the outside circumferential surface of the cylindrical portion 39 and the inside circumferential surface of support hole 32d, there are provided three annular seal members 127 fixedly mounted on the cylindrical portion 39 near the forward end and arranged to seal the first and second fluid passages 43 and 44 off from each other.

First fluid passage 43 includes a passage section 43a serving as a pressure chamber, and four branch passages 43b connecting the passage section 43a, respectively, with the four advance fluid pressure chambers 41. Passage section 43a is formed in an end portion of support hole 32d on the side of drive shaft 6. The four branch passages 43b are formed in vane rotor 32a and extend radially in vane rotor 32a.

Second fluid passage 44 includes an axially extending passage section extending axially in the cylindrical portion 39 to a closed end; an annular chamber 44a formed around the axially extending passage section near the closed end; and an L-shaped passage section 44b connecting the annular chamber 44a with each retard pressure chamber 42.

Directional control valve 47 of this example is a solenoid valve having four ports and three positions. A valve element inside the directional control valve 47 is arranged to alter the connection between first and second fluid passages 43 and 44 and the supply and drain passages 45 and 46 under the control of the controller 22.

When no control current is supplied to directional control valve 47 of exhaust VTC 2, directional control valve 47 is in its default position to hydraulically connect the supply passage 45 to second fluid passage 44 leading to retard fluid pressure chamber 42, and hydraulically connect the drain passage 46 to first fluid passage 43 leading to advance fluid pressure chamber 41. Directional control valve 47 includes a coil spring that mechanically holds a valve element of directional control valve 47 in such a default position that directional control valve 47 is in the default position described above.

The exhaust VTC 2 includes a lock mechanism disposed between vane member 32 and housing 34 for locking the vane member 32 in a predetermined rotational position with respect to housing 34 or allowing the rotation of vane member 32 with respect to housing 34. Specifically, this lock mechanism is disposed between rear cover 36 and the larger vane 32b. The lock mechanism includes a slide hole 50, a lock pin 51, a lock recess 52a, a spring retainer 53, and a coil spring 54, as shown in FIGS. 6 and 7. Slide hole 50 is formed in the larger vane 32b, extending in the axial direction of drive shaft 6. Lock pin 51 is cup-shaped, disposed in slide hole 50, and slidably supported on slide hole 50. Lock recess 52a is formed in a portion 52 fixed to a hole defined in rear cover 36, and arranged to receive a tip portion 51a of lock pin 51. The tip portion 51a is tapered. Spring retainer 53 is fixed to a bottom portion of slide hole 50. Coil spring 54 is retained by spring retainer 53, and arranged to bias the lock pin 51 toward the lock recess 52a.

The lock recess 52a is hydraulically connected to retard fluid pressure chamber 42 or pump 49 through a fluid passage not shown, and receives the hydraulic pressure in retard fluid pressure chamber 42 or the discharge pressure of the pump.

When vane member 32 is in its most retarded position with respect to housing 34, the lock pin 51 is biased by coil spring 54 toward lock recess 52a so that the tip portion 51a of lock pin 51 is fit in lock recess 52a. The relative rotation between timing sprocket 31 and drive shaft 6 is thus locked. When lock recess 52a receives the hydraulic pressure in retard fluid pressure chamber 42 or the discharge pressure of the oil pump, then lock pin 51 moves away from lock recess 52a, so as to release drive shaft 6 with respect to timing sprocket 31.

Between one side surface of each vane 32b and a confronting side surface of an adjacent one of the shoes 34a, there are disposed a pair of coil springs 55 and 56 serving as biasing means for urging the vane member 32 in the retard rotational direction. In other words, coil springs 55 and 56 serve as a biasing device arranged to bias the exhaust VTC 2 in a direction to retard the opening timing and the closing timing of exhaust valves 5.

Coil springs 55 and 56 are spaced with such an interaxis distance that the springs 55 and 56 do not contact each other even when the springs 55 and 56 are compressed to the maximum extent. The two coil springs 55 and 56 are connected through a retainer shaped like a thin sheet and fit in the recesses 32c of the corresponding shoe 34a.

The thus-constructed exhaust VTC 2 is controlled to operate as follows. When the engine is stopped or at rest, the controller 22 stops the output of the control current to directional control valve 47, so that the valve element of directional control valve 47 is placed in the default position as shown in FIG. 7A so as to allow fluid communication between supply passage 45 and second fluid passage 44 leading to retard fluid pressure chamber 42, and allow fluid communication between drain passage 46 and first fluid passage 43. Also, when the engine is at rest, the supplied fluid pressure is equal to zero, because oil pump 49 is also inoperative. Accordingly, vane member 32 is biased by coil springs 55, 56, so as to rotate in the counterclockwise direction about the axial direction of drive shaft 6 as viewed in FIG. 7A. As a result, vane member 32 is brought into a position such that the larger vane 32b is in contact with one confronting side surface of shoe 34a. Drive shaft 6 is thus in the most retarded position with respect to timing sprocket 31. Simultaneously, the tip portion 51a of lock pin 51 is inserted into lock recess 52a, so as to prevent drive shaft 6 from rotating with respect to timing sprocket 31. The exhaust VTC 2 is thus mechanically and stably held in its default position for most retarded exhaust valve opening timing EO and exhaust valve closing timing EC. The default position is defined as a position where a subject mechanism is mechanically and stably held when de-energized or when no control signal is issued.

When the engine is started by turning on the ignition switch and cranking the crankshaft 07 with drive motor 09 or the like, then directional control valve 47 starts to receive a control signal from controller 22. However, immediately after the cranking operation, vane member 32 is still held in the most retarded position by means of the lock mechanism and coil springs 55, 56, because the discharge pressure of oil pump 49 is not yet sufficiently high. At this moment, based on the control signal from controller 22, directional control valve 47 allows fluid communication between supply passage 45 and second fluid passage 44, and between drain passage 46 and first fluid passage 43. As the cranking operation proceeds, the oil pressure from oil pump 49 is raised and supplied through second fluid passage 44 to retard fluid pressure chambers 42, while the advance fluid pressure chambers 41 are held in a low pressure state in which no oil pressure is supplied, and the oil pressure is drained through drain passage 46 into oil pan 48.

After the cranking rotation rises so that the discharge pressure of oil pump 49 is increased sufficiently, the controller 22 can control the position of vane member 32 by means of directional control valve 47. When the hydraulic pressure in retard fluid pressure chamber 42 rises, then the hydraulic pressure in lock recess 52a of the lock mechanism rises so as to move the lock pin 51 out of lock recess 52a. This allows rotation of vane member 32 with respect to housing 34.

In some situations, controller 22 operates the directional control valve 47 to the position connecting the supply passage 45 with first fluid passage 43 and connecting the drain passage 46 with second fluid passage 44. Therefore, the oil pressure in retard fluid pressure chambers 42 is decreased by return through second fluid passage 44 and drain passage 46 to oil pan 48, whereas the oil pressure in advance fluid pressure chambers 41 is increased by supply of the oil pressure. Vane member 32 rotates in the clockwise direction by the high pressure in advance fluid pressure chambers 41, against the elastic forces of coil springs 55 and 56, and thereby shifts the relative rotational phase of drive shaft 6 relative to timing sprocket 31 to the advance side, as shown in FIG. 7B. Then, the relative rotational phase is held at any desired position by keeping the directional control valve 47 in its neutral position.

After engine start, controller 22 controls the relative rotational phase of drive shaft 6 continuously between the most retarded position shown in FIG. 7A and the most advanced position shown in FIG. 7B according to engine operating state.

The intake VTC 3 of this example is of a vane type like the exhaust VTC 2. The intake VTC 3 includes a timing sprocket 60 for transmitting rotation from crankshaft 07 to an intake camshaft 59; a vane member 61 which is fixed to one end of intake camshaft 59 and received rotatably in the timing sprocket 60; and a hydraulic circuit to rotate vane member 61 in the forward and reverse directions by the use of an oil pressure.

The hydraulic circuit of the intake VTC 3 has a construction similar to the construction of the hydraulic circuit of the exhaust VTC 2, and has a three position directional control valve similar to directional control valve 47. Namely, the hydraulic circuit includes a first fluid passage leading to advance fluid pressure chambers to supply and drain an advance fluid pressure of an operating oil to and from the advance fluid pressure chambers; a second fluid passage leading to retard fluid pressure chambers to supply and drain a retard fluid pressure of the operating oil to and from the retard fluid pressure chambers; and the directional control valve connecting the first fluid passage and second fluid passage selectively with a supply passage and a drain passage. The directional control valve includes a movable valve element inside, and operates under control of controller 22.

Figure 9:
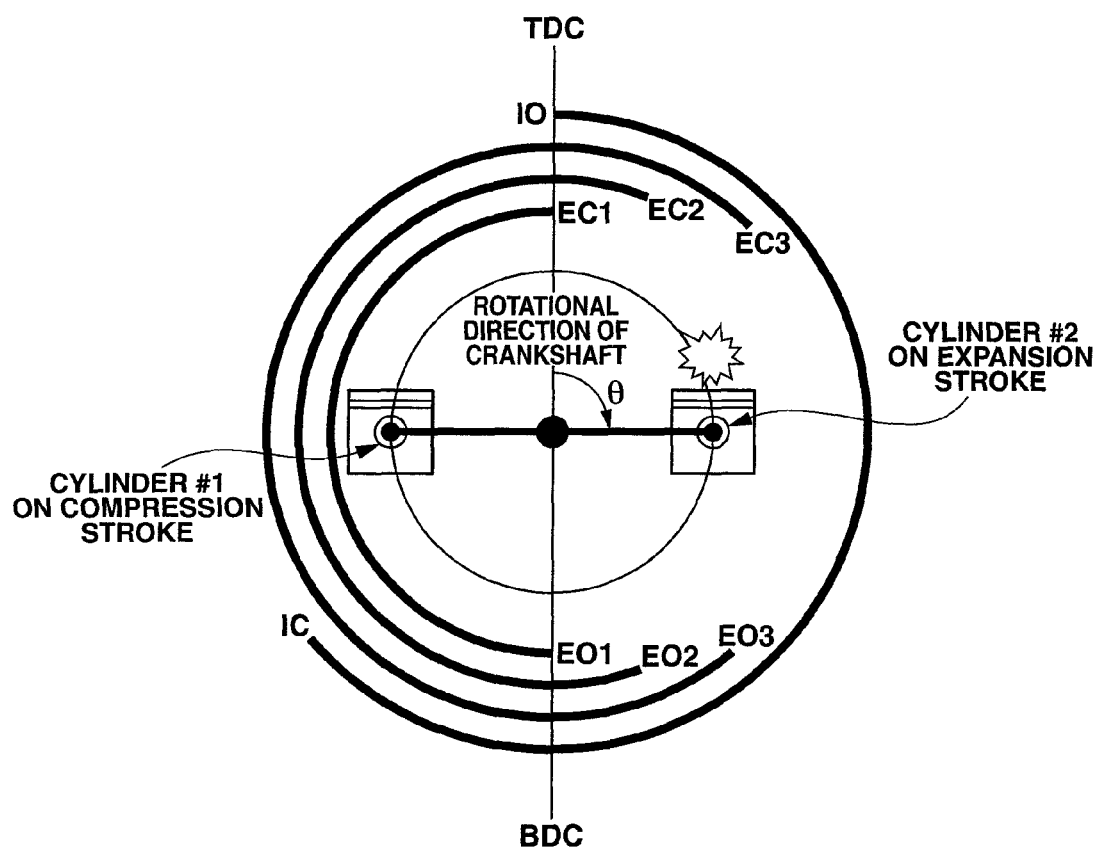
FIG. 9 is a schematic diagram showing settings of exhaust valve opening timing and exhaust valve closing timing by the exhaust valve operating angle varying mechanism.

The following describes a control method for controlling the exhaust valve opening timing EO and exhaust valve closing timing EC according to the first embodiment. This control method is based on operation of the exhaust VEL 1, whereas the exhaust VTC 2 and intake VTC 3 are maintained in constant operating states. FIG. 9 shows settings of valve operation of intake valves 4, 4 and exhaust valves 5, 5. The exhaust valve opening timing EO and exhaust valve closing timing EC of exhaust valves 5 are controlled by the exhaust VEL 1, whereas the intake valve opening timing IO and intake valve closing timing IC of intake valves 4 are held constant by the inactive intake VTC 3.

When the valve lift L and valve operating angle D of exhaust valve 5 is set to the small lift setting L1 and small operating angle setting D1 by the exhaust VEL 1, the exhaust valve opening timing EO and exhaust valve closing timing EC of exhaust valve 5 are at exhaust valve opening timing setpoint EO1 and exhaust valve closing timing setpoint EC1, respectively, as shown in FIG. 9. Similarly, when the valve lift L and valve operating angle D of exhaust valve 5 is set to the medium lift setting L2 and medium operating angle setting D2 by the exhaust VEL 1, the exhaust valve opening timing EO and exhaust valve closing timing EC are at exhaust valve opening timing setpoint EO2 and exhaust valve closing timing setpoint EC2, respectively, as shown in FIG. 9. Similarly, when the valve lift L and valve operating angle D of exhaust valve 5 is set to the large lift setting L3 and large operating angle setting D3 by the exhaust VEL 1, the exhaust valve opening timing EO and exhaust valve closing timing EC are at exhaust valve opening timing setpoint EO3 and exhaust valve closing timing setpoint EC3, respectively, as shown in FIG. 9. In this control, small operating angle setting D1 and small lift setting L1 are minimum settings of the valve operating angle D and valve lift L of exhaust valve 5.

The state or position of crankshaft 07 is also shown in FIG. 9. In FIG. 9, the relationship between the piston position and the crank angle is simply expressed with the position of the piston pin and the position of the crank pin are expressed as a single point although the connecting rod actually exists and is connected between piston pin and the crank pin as described above and shown in FIG. 1.

Figure 10:
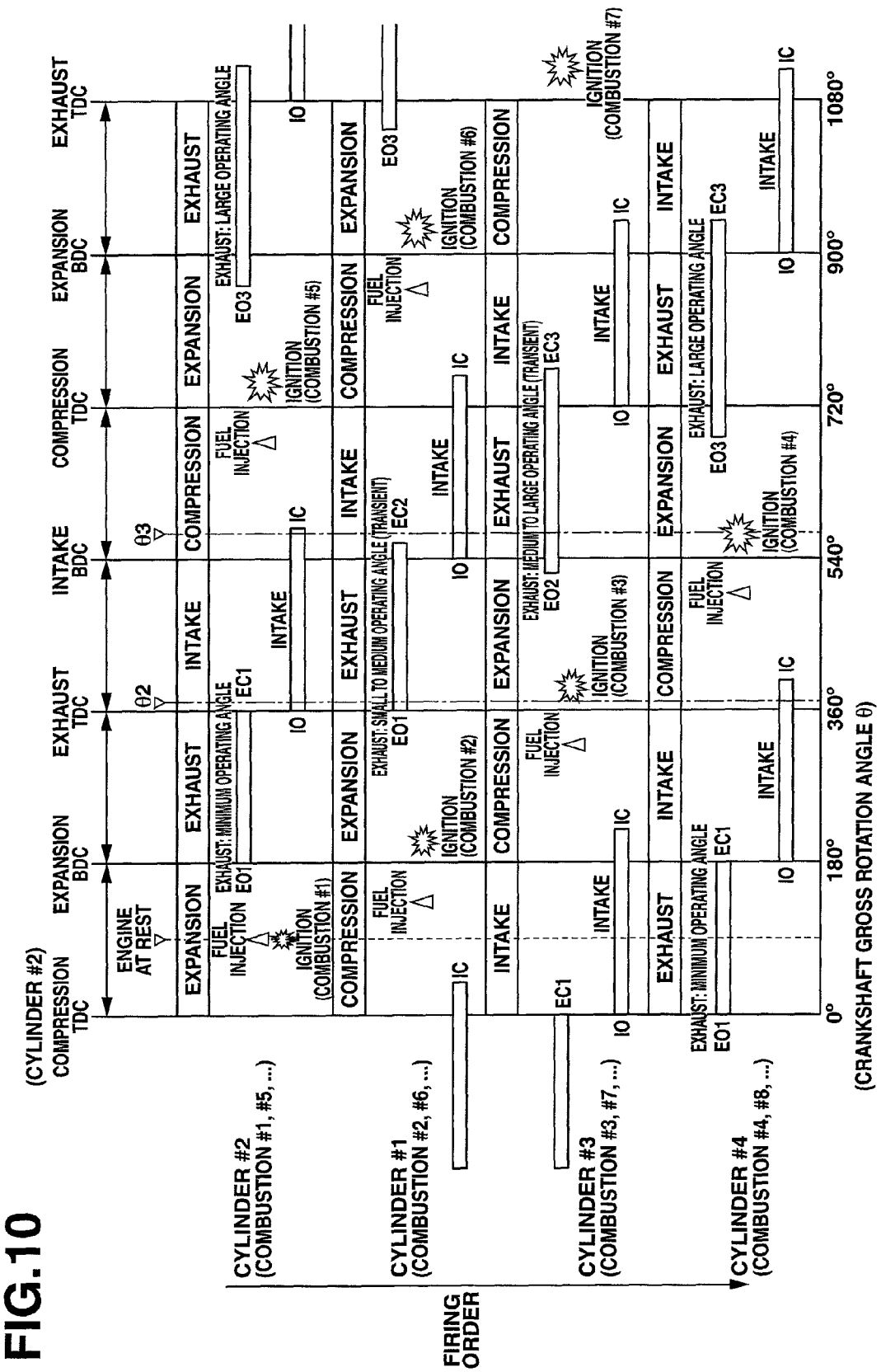
FIG. 10 is a diagram illustrating a sequence of engine startup in which valve operation of each cylinder is controlled by the variable valve actuating system.

FIG. 10 illustrates a sequence of engine startup in which valve operation of each cylinder of the four-cylinder internal combustion engine is controlled by the variable valve actuating system according to the present embodiment. This sequence is based on assumption that when the engine is at rest, namely, before the engine start control is started, cylinder #2 is at rest on expansion stroke, where cylinder #1, cylinder #2, cylinder #3 and cylinder #4 are arranged in this order from the front end to rear end of the engine. This assumption is just an example. Any one of the cylinders may be a cylinder on expansion stroke when the engine is at rest, which is the first target to be handled by this valve operation control. The horizontal axis of the diagram of FIG. 10 indicates a crankshaft gross rotation angle θ which is measured with respect to the last compression top dead center of cylinder #2. The sequence is based on a general firing order of cylinder #1, cylinder #3, cylinder #4 and cylinder #2.

When the engine is at rest, the crankshaft gross rotation angle θ is at or close to 90 degrees as indicated by a broken line in FIG. 10, for the following reason regarding incylinder pressure. Immediately before the engine is completely stopped, fuel injection and ignition is already stopped so that air flows into or out of each cylinder without combustion, while crankshaft 07 is rotating slowly in the clockwise direction in FIG. 1 and decelerating. When the crankshaft gross rotation angle θ of crankshaft 07 exceeds the point of 90 degrees so that the piston of cylinder #1 enters the compression stroke and starts to move downward and compress incylinder air, then the compressed air presses the piston of cylinder #1 back in the upward direction so as to reverse the rotation of crankshaft 07, i.e., start to rotate crankshaft 07 in the counterclockwise direction in FIG. 1. Conversely, the counterclockwise rotation of crankshaft 07 causes the piston of cylinder #2 to start to move downward and compress incylinder air, then the compressed air presses the piston of cylinder #2 back in the upward direction so as to reverse the rotation of crankshaft 07, i.e., start to rotate crankshaft 07 in the clockwise direction in FIG. 1. This cycle of movement of crankshaft 07 is repeated but gradually suppressed so that the crankshaft gross rotation angle θ is brought to and stabilized at the point of 90 degrees or neighborhood.

Immediately after the engine is stopped, air flows into each cylinder through the opened intake valves 4, 4 or exhaust valves 5, 5 in the cases of cylinder #3 and cylinder #4 and through the clearance between the periphery of piston 03 and the wall of the cylinder bore in the cases of cylinder #2 and cylinder #1 whose intake valves 4 and exhaust valves 5, 5 are closed. Accordingly, the internal pressure of each cylinder becomes substantially equal to the atmospheric pressure when the engine is at rest.

When a predetermined requirement described in detail below is satisfied for restart of the engine, then controller 22 starts to perform a combustion-based cranking engine start in which fuel injection and ignition are performed in cylinder #2 on the expansion stroke in a manner that combustion pressure causes crankshaft 07 to start to rotate with no external crank torque other than the crank torque based on the combustion pressure.

The combustion pressure generated by the initial combustion event is low in general, because the incylinder volumetric capacity of cylinder #2 when the engine is at rest is only substantially half the displacement per cylinder, and the incylinder pressure is equal to about the atmospheric pressure. Accordingly, it is generally difficult to rotate crankshaft 07 against a reaction force from the piston 03 of the second cylinder or second combustion cylinder (cylinder #1) due to compression, etc.

This embodiment addresses the problem about engine start described above generally by causing the exhaust valve opening timing EO of exhaust valve 5 to retard toward bottom dead center as shown in FIG. 9. This feature results in delaying the timing combustion pressure falls due to flow-out of exhaust gas, namely, extending the effective expansion stroke, and efficiently convert the relatively low combustion pressure into a crank torque for cranking the crankshaft 07. This allows rotation of crankshaft 07 to be quickly accelerated, and allows the piston of the second combustion cylinder (cylinder #1) to pass through the compression top dead center.

On the other hand, the exhaust valve closing timing EC is advanced to exhaust valve closing timing setpoint EC1 close to top dead center, because the valve operating angle D of exhaust valve 5 is set to the small operating angle setting D1 to achieve the exhaust valve opening timing setpoint EO1. This reduces or eliminates to zero or negative the valve overlap O/L between the exhaust valve closing timing EC (at exhaust valve closing timing setpoint EC1) and the next intake valve opening timing IO of intake valve 4, wherein "negative" means a condition that an interval exists between the exhaust valve closing timing EC and the intake valve opening timing IO.

The small or zero valve overlap O/L produces the following advantageous effects. Although the amount of exhaust gas produced by the first combustion event of cylinder #2 is small, the small valve overlap O/L serves to suppress the amount of exhaust gas entering the intake side, and maximize the amount of exhaust gas normally flowing through an exhaust gas purifying catalyst, and suitably heat and activate the catalyst. The exhaust gas produced by the initial combustion event generally contains unburned fuel through incomplete combustion because this exhaust gas is produced under condition of low incylinder pressure (atmospheric pressure), which causes thermal reaction in the catalyst and promotes the heating and activating of the catalyst. This suppresses the emission reduction performance from falling due to low temperature during the period of this combustion event and after this period.

The following describes the initial combustion event of the second combustion cylinder (cylinder #1). When the engine is at rest and the crankshaft gross rotation angle θ is substantially equal to 90 degrees, cylinder #1 is on the compression stroke with the incylinder pressure substantially equal to the atmospheric pressure. As crankshaft 07 starts to be rotated by the initial combustion event of cylinder #2, the piston 03 of cylinder #1 moves upward to increase the incylinder pressure of cylinder #1. Then, fuel is injected into the cylinder and ignition is performed to produce the initial combustion event of cylinder #1 (the second combustion event, or combustion #2).

In the second combustion event, the compression pressure is higher (about 5 atmospheric pressure at compression of an effective compression ratio of 5), and the combustion pressure is also higher than in the first combustion event of cylinder #2.

However, the second combustion event is still unstable in general because the amount of incylinder air for the second combustion event is substantially equal to the amount of incylinder pressure for the first combustion event of cylinder #2. In consideration of this fact, the exhaust valve opening timing EO of exhaust valve 5 is maintained at exhaust valve opening timing setpoint EO1 as in the first combustion event, as shown in FIG. 10. This feature serves to efficiently convert the insufficient combustion pressure into a crank torque to rotate the crankshaft 07, and thereby further promote quick rise of rotation of crankshaft 07.

Then, when the crankshaft gross rotation angle θ reaches an angle θ2 just after 360 degrees (just after the exhaust valve opening timing setpoint EO1 of the second combustion cylinder (cylinder #1)), controller 22 sends to the exhaust VEL 1 a control signal for setting the valve operating angle D to the medium operating angle setting D2 (and medium lift setting L2). Accordingly, the exhaust valve closing timing EC of exhaust valve 5 is controlled to retard to the exhaust valve closing timing setpoint EC2. In this way, in the second combustion event, the exhaust valve opening timing EO is maintained at the exhaust valve opening timing setpoint EO1, whereas the exhaust valve closing timing EC is dynamically changed to the exhaust valve closing timing setpoint EC2.

The retard control to exhaust valve closing timing setpoint EC2 results in a medium valve overlap O/L between the exhaust valve closing timing setpoint EC2 and the next intake valve opening timing IO of intake valve 4. This feature serves to return to the intake side not to the exhaust side some amount of exhaust gas which contains highly-concentrated hydrocarbons HC which are pulled up by the piston immediately before the end of the exhaust stroke. The returned amount of exhaust gas containing highly-concentrated hydrocarbons is burned again in the next combustion event of cylinder #1 (combustion #6), so that the amount of hydrocarbon emissions is reduced.

On the other hand, the return of exhaust gas by the medium valve overlap O/L results in a reduction in the quantity of exhaust gas flowing into the catalyst in the downstream side of the exhaust pipe. However, the warming-up by the first combustion event of cylinder #2 is still effective, and the reduction of hydrocarbon emissions in the exhaust gas containing highly-concentrated hydrocarbons serves to reduce the amount of hydrocarbon emissions, so that the amount of hydrocarbon emissions is reduced totally. The medium valve overlap O/L has a further effect of reducing the pump loss, and thereby improving the fuel efficiency. The setting to the medium valve overlap O/L may be replaced with continuation of the small valve overlap O/L and exhaust valve closing timing setpoint EC1, for increasing the amount of exhaust gas flowing into the catalyst and thereby enhancing activation of the catalyst in the initial stage.

The following describes the initial combustion event of the third cylinder or third combustion cylinder (cylinder #3), i.e., the third combustion event of the engine.

When the engine is at rest and the crankshaft gross rotation angle θ is equal to 90 degrees, cylinder #3 is on the intake stroke. After the engine is started so that crankshaft 07 rotates and the piston 03 of cylinder #3 moves down to bottom dead center, air is introduced into the cylinder through the intake valves 4, 4, wherein the amount of intake air is relatively large because of slow rotation of crankshaft 07 or the like, although only half of the intake stroke is effective. Then, the full part of compression stroke from bottom dead center to top dead center causes the intake air to be sufficiently compressed. In this way, the incylinder pressure of cylinder #3 in the third combustion event is higher than in the first combustion event in cylinder #2 and the second combustion event in cylinder #1. Moreover, the amount of intake air is larger than in the first combustion event in cylinder #2 and the second combustion event in cylinder #1, because the rotational speed of crankshaft 07 is higher. This serves to enhance the driving torque of the engine, and allows the exhaust valve opening timing EO of exhaust valve 5 to be increased from the exhaust valve opening timing setpoint EO2, so that a large amount of exhaust gas at high temperature can be supplied to the exhaust catalyst. This serves to further activate the catalyst by heating, and thereby effectively purify the increased amount of exhaust gas (the amount of emissions). The advance to the exhaust valve opening timing setpoint EO2 serves to reduce a gas-displacing loss (due to resistance against which the piston acts to move and displace exhaust gas), and thereby enhance the fuel efficiency.

The change of the exhaust valve opening timing EO to the exhaust valve opening timing setpoint EO2 is in response to a control signal from controller 22 to the exhaust VEL 1 which is outputted at the time of angle θ2. Thereafter, when the crankshaft gross rotation angle θ reaches an angle θ3 immediately after the exhaust valve closing timing setpoint EC2 of the second combustion cylinder (cylinder #1), controller 22 outputs to the exhaust VEL 1 a control signal for setting the valve operating angle D to the large operating angle setting D3. In this way, in the third combustion event, the exhaust valve opening timing EO is at the exhaust valve opening timing setpoint EO2, whereas the exhaust valve closing timing EC is retarded to the exhaust valve closing timing setpoint EC3.

As a result, the valve overlap O/L in the third combustion event is relatively large between the exhaust valve closing timing setpoint EC3 and the next intake valve opening timing IO.

This feature serves to return to the intake side not to the exhaust side some amount of exhaust gas which contains highly-concentrated hydrocarbons HC which are pulled up by the piston immediately before the end of the exhaust stroke. The returned amount of exhaust gas containing highly-concentrated hydrocarbons is burned again in the next combustion event of cylinder #3 (combustion #7), so that the amount of hydrocarbon emissions exhausted from the cylinder to the catalyst is reduced. This effect is enhanced by the advance control of the exhaust valve opening timing EO to the exhaust valve opening timing setpoint EO2.

The increase in valve overlap O/L also serves to reduce the pump loss significantly, and thereby enhance the fuel efficiency.

The following describes the initial combustion event of the fourth combustion cylinder or fourth combustion cylinder (cylinder #4), i.e., the fourth combustion event of the engine.

When the engine is at rest and the crankshaft gross rotation angle θ is equal to 90 degrees, cylinder #4 is on the exhaust stroke. After the engine is started so that crankshaft 07 rotates and the piston 03 of cylinder #4 moves up toward top dead center, air is exhausted out of the cylinder through the exhaust valves 5, 5. Then, cylinder #4 shifts from the exhaust stroke to the intake stroke so that the full stroke of the piston from the neighborhood of top dead center serves to intake a maximum amount of air. The amount of intake air is larger than in the third combustion event. This large amount of air and the full stroke of compression serve to further increase the combustion pressure and the amount of exhaust gas.

In the fourth combustion event, the exhaust valve opening timing EO and exhaust valve closing timing EC of exhaust valve 5 are at exhaust valve opening timing setpoint EO3 and exhaust valve closing timing setpoint EC3, respectively, both of which are after angle θ3. The sufficiently advanced exhaust valve opening timing EO at the exhaust valve opening timing setpoint EO3 allows a large amount of exhaust gas at high temperature to be supplied to the exhaust catalyst. This serves to further activate the catalyst by heating. As in the third combustion event, the valve overlap O/L in the fourth combustion event is relatively large between the exhaust valve closing timing setpoint EC3 and the next intake valve opening timing IO. This feature serves to return to the intake side not to the exhaust side some amount of exhaust gas which contains highly-concentrated hydrocarbons HC which are pulled up by the piston immediately before the end of the exhaust stroke. The returned amount of exhaust gas containing highly-concentrated hydrocarbons is burned again in the next combustion event of cylinder #4 (combustion #8), so that the amount of hydrocarbon emissions is reduced. This effect is enhanced by the advance control of the exhaust valve opening timing EO to the exhaust valve opening timing setpoint EO3.

The advance to the exhaust valve opening timing setpoint EO3 also serves to reduce the gas-displacing loss, and the increase in valve overlap O/L also serves to reduce the pump loss significantly, and thereby enhance the fuel efficiency.

Figure 11:
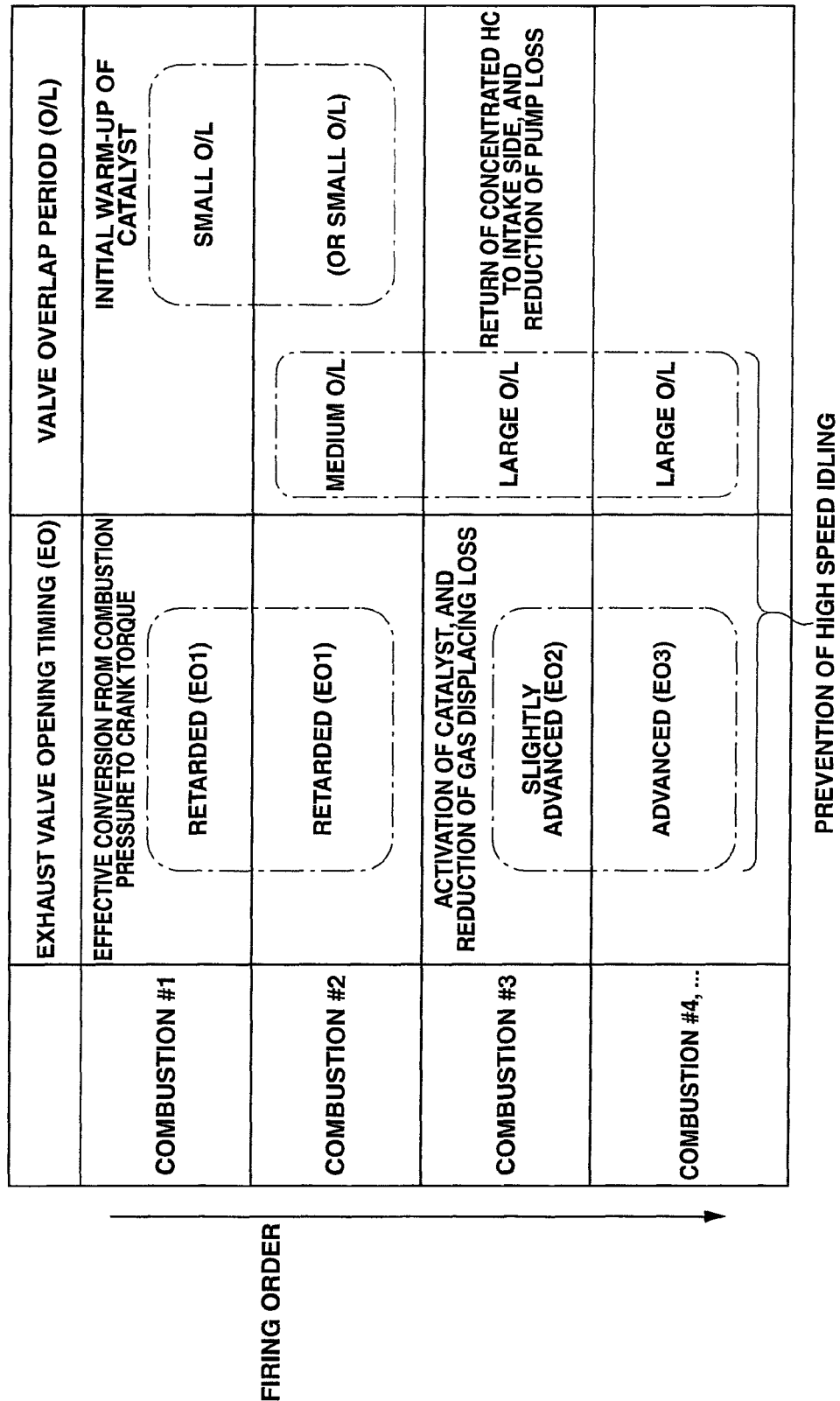
FIG. 11 is a table summering how the variable valve actuating system operates and produces advantageous effects.

FIG. 11 summarizes advantageous effects produced by the features of the first embodiment. In the first combustion event in the first cylinder (cylinder #2) in which combustion energy is insufficient, the exhaust valve opening timing EO of exhaust valve 5 is retarded to the exhaust valve opening timing setpoint EO1 so that the combustion pressure is efficiently converted into a torque for driving the crankshaft 07, and smoothly and quickly raising the rotational speed of crankshaft 07. The reduction or elimination of valve overlap O/L serves to supply to the catalyst a maximum amount of exhaust gas containing a large amount of unburned gas, and thereby quickly enhance the temperature of the catalyst and quickly activate the catalyst.

In the second combustion event in the second combustion cylinder (cylinder #1) in which the combustion energy is higher than in the first combustion event but relatively small, the exhaust valve opening timing EO of exhaust valve 5 is retarded to the exhaust valve opening timing setpoint EO1 as in the first combustion event so that the combustion pressure is efficiently converted into a torque for driving the crankshaft 07, and smoothly and quickly raising the rotational speed of crankshaft 07. On the other hand, the medium valve overlap O/L serves to return to the intake side not to the exhaust side some amount of exhaust gas which contains highly-concentrated hydrocarbons HC which are pulled up by the piston immediately before the end of the exhaust stroke. The returned amount of exhaust gas containing highly-concentrated hydrocarbons is burned again in the next combustion event, so that the amount of hydrocarbon emissions is reduced. Moreover, the pump loss is reduced to enhance the fuel efficiency. As an alternative depending on the condition, the valve overlap O/L is maintained small as in the first combustion event to further quickly raise the catalyst temperature.

In the third combustion event in the third combustion cylinder (cylinder #3) in which the rotational speed of crankshaft 07 has risen and the amount of exhaust gas per one cycle has increased, the exhaust valve opening timing EO of exhaust valve 5 is slightly advanced to the exhaust valve opening timing setpoint EO2, the exhaust gas is supplied to the catalyst before the temperature of the exhaust gas falls, so that the catalyst is further heated and activated.

That feature that the valve overlap O/L in the third combustion event is relatively large between the exhaust valve closing timing setpoint EC3 and the next intake valve opening timing IO serves to return to the intake side not to the exhaust side some amount of exhaust gas which contains highly-concentrated hydrocarbons HC which are pulled up by the piston immediately before the end of the exhaust stroke. The returned amount of exhaust gas containing highly-concentrated hydrocarbons is burned again in the next combustion event, so that the amount of hydrocarbon emissions is reduced. The advance to the exhaust valve opening timing setpoint EO2 serves to reduce the gas-displacing loss resulting from the increase of exhaust gas. Also, the pump loss is reduced by the increase of the valve overlap O/L, which serves to further enhance the fuel efficiency.

In the fourth combustion event in the fourth combustion cylinder (cylinder #4) in which the rotational speed of crankshaft 07 has risen further and the amount of exhaust gas per one cycle has increased further, the exhaust valve opening timing EO of exhaust valve 5 is advanced further to exhaust valve opening timing setpoint EO3, so that the exhaust gas is supplied to the catalyst before the temperature of the exhaust gas falls, and the catalyst is further heated and activated.

That feature that the valve overlap O/L in the third combustion event is relatively large between the exhaust valve closing timing setpoint EC3 and the next intake valve opening timing IO serves to return to the intake side not to the exhaust side some amount of exhaust gas which contains highly-concentrated hydrocarbons HC which are pulled up by the piston immediately before the end of the exhaust stroke. The returned amount of exhaust gas containing highly-concentrated hydrocarbons is burned again in the next combustion event, so that the amount of hydrocarbon emissions is reduced. The sufficient advance to the exhaust valve opening timing setpoint EO3 serves to reduce the gas-displacing loss resulting from the increase of exhaust gas, and reduce the pump loss and enhance the fuel efficiency by the increase of valve overlap O/L.

The retard control to exhaust valve opening timing setpoint EO2 in the third combustion event or exhaust valve opening timing setpoint EO3 in the fourth combustion event, serves to allow exhaust gas to flow out in early timing, and thereby prevent the engine speed from abnormally rising at the later stage of the quick combustion-based cranking engine start, in addition to the advantageous effects described above.

After the first combustion event, the valve overlap O/L is gradually increased through the medium setting to the large setting. This feature serves to enhance the concentration of exhaust gas in the intake air in or after the sixth combustion event, and thereby suppress the combustion torque from suddenly increasing, and suppress the engine rotation from abnormally increasing. In this way, quick rise of the engine rotation is achieved by the combustion-based cranking engine start, while abnormal high-speed idling condition which generally tends to be caused by combustion-based cranking engine start, is suppressed by the advance control of the exhaust valve opening timing EO of exhaust valve 5 and the increase of the valve overlap O/L.

As described above, the present embodiment produces the effect of allowing the rotation of crankshaft 07 to quickly rise, the effect of reducing emissions, the effect of achieving combustion-based cranking engine start with high fuel efficiency, and the effect of suppressing abnormal high-speed engine idling.

Figure 12:
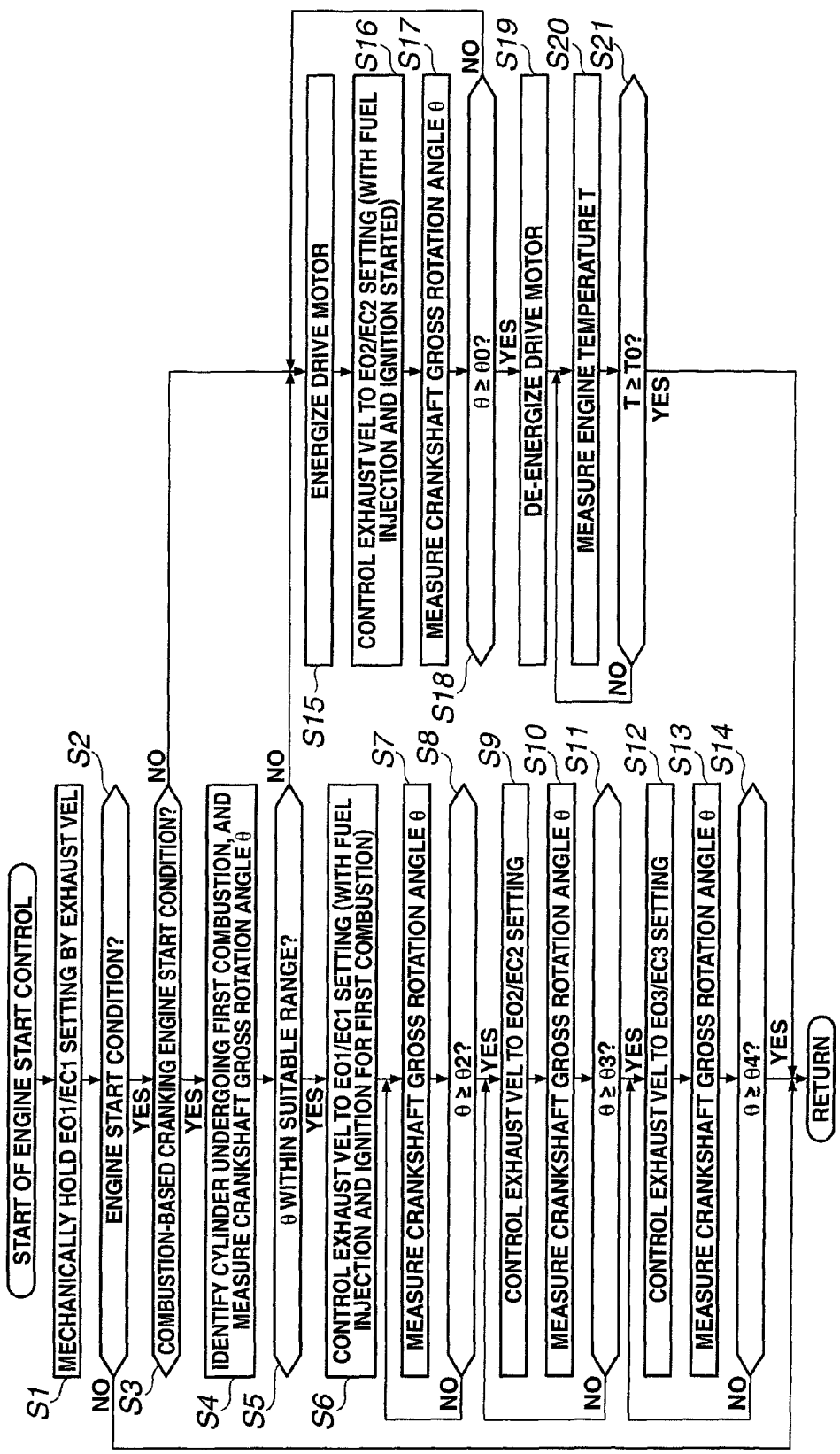
FIG. 12 is a flow chart showing a control process performed by a controller of the variable valve actuating system.

FIG. 12 is a flow chart showing a control process performed by controller 22 of the variable valve actuating system.

At Step S1, controller 22 allows the exhaust VEL 1 to mechanically hold the exhaust valve opening timing EO and exhaust valve closing timing EC at the exhaust valve opening timing setpoint EO1 and exhaust valve closing timing setpoint EC1 as default settings by the biasing force of coil spring 30. At this time, controller 22 checks based on the sensor signal whether the exhaust valve opening timing EO and exhaust valve closing timing EC is set to the exhaust valve opening timing setpoint EO1 and exhaust valve closing timing setpoint EC1. Instead of or in addition to the biasing force of coil spring 30, for achieving the default operating position, a high-power electric motor may be provided which is capable of actuating the exhaust VEL 1 to change the exhaust valve opening timing EO and exhaust valve closing timing EC even when crankshaft 07 is not driven.

At Step S2, controller 22 determines whether or a predetermined engine start condition is satisfied. When the answer to step S2 is negative (NO), then controller 22 returns from this control process. On the other hand, when the answer to step S2 is affirmative (YES), then controller 22 proceeds to Step S3.

At Step S3, controller 22 determines whether or a predetermined combustion-based cranking engine start condition is satisfied. When the answer to step S3 is NO, then controller 22 proceeds to Step S15. On the other hand, when the answer to step S3 is YES, then controller 22 proceeds to Step S4. The combustion-based cranking engine start is an operation in which initial cranking operation is implemented by an initial combustion event not by means of drive motor 09 or the like, as implemented by the first combustion event described above. However, the drive motor 09 may be used to add an assist torque to rotate crankshaft 07.

Whenever drive motor 09 is used or not, the combustion-based cranking engine start serves to eliminate or reduce the load applied to pinion gear mechanism 08, and thereby reduce mechanical noise, and achieve quick rise of the engine speed. These advantageous effects are significant especially when the variable valve actuating system is applied to a motor vehicle provided with an idle reduction system by which an engine is stopped and restarted repeatedly during operation of the vehicle.

When the engine is started from a cold state, the engine tends to fail to perform stable combustion operation. In addition, it is generally unnecessary to quickly start the engine as compared to situations where the vehicle stops so that the engine is temporarily automatically stopped. Accordingly, in such situations, normal engine start is selected with prioritizing the reliability of engine start higher than the quietness or quickness of engine start. In consideration of the above, at Step S3, when engine temperature T is below a predetermined reference level, controller 22 determines that the predetermined combustion-based cranking engine start condition is unsatisfied. On the other hand, when engine temperature T is above the predetermined reference level, controller 22 determines that the predetermined combustion-based cranking engine start condition is satisfied.

At Step S4, controller 22 identifies the first combustion cylinder that is on the expansion stroke, with reference to the crank angle measured by crank angle sensor 010. Then, controller 22 identifies the compression top dead center of the first combustion cylinder, and sets the crankshaft gross rotation angle θ with respect to the compression top dead center.

At Step S5, controller 22 determines whether or not the crankshaft gross rotation angle θ is within a predetermined suitable range 91 from 90 degrees (for example, a range of 60 to 120 degrees). When the answer to step S5 is NO, then controller 22 determines that it is difficult to perform reliable combustion-based cranking operation, and proceeds to Step S15. On the other hand, when the answer to step S5 is YES, then controller 22 proceeds to Step S6. Step S5 may be omitted, if the variable valve actuating system is provided with a crank stop position control system which is implemented with drive motor 09 to precisely hold the crankshaft gross rotation angle θ at about 90 degrees when the engine is at rest.

At Step S6, controller 22 starts combustion-based cranking operation. Controller 22 outputs to the exhaust VEL 1 a control signal for setting the exhaust valve opening timing EO and exhaust valve closing timing EC to the exhaust valve opening timing setpoint EO1 and exhaust valve closing timing setpoint EC1 (small operating angle setting D1) by electric motor 20, taking account of possibility that start of rotation of crankshaft 07 may cause fluctuations in the load applied to control shaft 17, although the exhaust VEL 1 mechanically holds the exhaust valve opening timing EO and exhaust valve closing timing EC to the exhaust valve opening timing setpoint EO1 and exhaust valve closing timing setpoint EC1 when the engine is at rest. Under that condition, controller 22 performs a combustion control of injecting fuel in the first combustion cylinder (cylinder #2) and igniting. Accordingly, crankshaft 07 starts to be rotated where the exhaust valve opening timing EO is set to the exhaust valve opening timing setpoint EO1 in the first combustion cylinder (cylinder #2).

In the first combustion cylinder (cylinder #2), the small valve overlap O/L by the advance of the exhaust valve closing timing EC to exhaust valve closing timing setpoint EC1 serves to promote initial temperature rise and activation of the catalyst.

At Step S7, controller 22 measures the crankshaft gross rotation angle θ by crank angle sensor 010. Then, at Step S8, controller 22 determines whether or not the crankshaft gross rotation angle θ is greater than or equal to θ2. When the answer to step S8 is YES, then controller 22 proceeds to Step S9. On the other hand, when the answer to step S8 is NO, then controller 22 returns to Step S7. At Step S9, controller 22 sets the valve operating angle D to medium operating angle setting D2 (EC2/EO2). Accordingly, the valve overlap O/L after the second combustion event in the second combustion cylinder (cylinder #1) is slightly increased so as to return to the intake side not to the exhaust side the portion of exhaust gas containing highly concentrated hydrocarbons at the end of the exhaust stroke due to the increase of exhaust gas, and thereby reduce the amount of hydrocarbon emissions.

At that moment, the valve operating angle D of exhaust valve 5 at the exhaust valve opening timing EO of exhaust valve 5 is at the small operating angle setting D1, and the exhaust valve opening timing EO of exhaust valve 5 is held at the exhaust valve opening timing setpoint EO1. Accordingly, the rotational speed of crankshaft 07 is increased similarly as in the first combustion cylinder (cylinder #2).

At Step S10, controller 22 measures the crankshaft gross rotation angle θ by crank angle sensor 010. Then, at Step S11, controller 22 determines whether or not the crankshaft gross rotation angle θ is greater than or equal to θ3. When the answer to step S11 is YES, then controller 22 proceeds to Step S12. On the other hand, when the answer to step S11 is NO, then controller 22 returns to Step S9. At Step S12, controller 22 sets the valve operating angle D to large operating angle setting D3 (EC3/EO3). Accordingly, the valve overlap O/L after the third combustion event in the third combustion cylinder (cylinder #3) is further increased so as to return to the intake side not to the exhaust side the portion of exhaust gas containing high concentration hydrocarbons at the end of the exhaust stroke due to the increase of exhaust gas, and thereby reduce the amount of hydrocarbon emissions.

The valve operating angle D of exhaust valve 5 at the moment when exhaust valve 5 opens is still at the medium operating angle setting D2 so that the exhaust valve opening timing EO is at the slightly advanced exhaust valve opening timing setpoint EO2, and exhaust gas still at high temperature is supplied to the catalyst. This serves to heat and activate the catalyst, and thereby purify the increased amount of exhaust gas emissions effectively, and enhance the fuel efficiency as described above.

Regarding the fourth combustion cylinder (cylinder #4), the valve overlap O/L after the fourth combustion event is increased as in the third combustion cylinder (cylinder #3) so as to return to the intake side not to the exhaust side the portion of exhaust gas containing high concentration hydrocarbons at the end of the exhaust stroke due to the increase of exhaust gas, and thereby reduce the amount of hydrocarbon emissions.

The valve operating angle D of exhaust valve 5 at the moment when exhaust valve 5 opens is at the large operating angle setting D3 so that the exhaust valve opening timing EO is at the significantly advanced exhaust valve opening timing setpoint EO3, and the further increased amount of exhaust gas at further high temperature is supplied to the catalyst. This serves to further heat and activate the catalyst, and thereby purify the increased amount of exhaust gas emissions effectively, and enhance the fuel efficiency as described above.

The increase of the valve overlap O/L by the advance control of the exhaust valve opening timing EO in or after the third combustion event serves to prevent the engine speed from abnormally rising, as described above.

At Step S13, controller 22 measures the crankshaft gross rotation angle θ by crank angle sensor 010. Then, at Step S14, controller 22 determines whether or not the crankshaft gross rotation angle θ is greater than or equal to θ4. When the answer to step S14 is YES, then controller 22 determines that the warming-up of the engine system is completed, and returns from this control process. On the other hand, when the answer to step S14 is NO, then controller 22 returns to Step S12.

After return from the control process shown in FIG. 12, controller 22 controls the exhaust VEL 1 according to the engine operating state with reference to a prepared operation map, so that the valve lift L of exhaust valve 5 varies between the small lift setting L1 and maximum lift setting L4.

Although the valve operation timing is shifted to a steady-state condition through the first to fourth combustion events in this embodiment, the rate of change of valve operation timing may be slower, namely, the shift to the steady-state condition may be implemented by the first to fifth or more combustion events. This slower shift eliminates the necessity of enhancing the response of operation of the exhaust VEL 1, which is advantageous in reducing the energy required for quick operation of the exhaust VEL 1, and thereby reduce energy consumption.

At Step S15, which follows the negative answer at Step S3 or S5, controller 22 selects normal engine start instead of combustion-based cranking engine start, so that the cranking operation starts to be implemented by drive motor 09.

Then, at Step S16, controller 22 sets the valve operating angle D of exhaust valve 5 to the medium operating angle setting D2 (exhaust valve opening timing setpoint EO2 and exhaust valve closing timing setpoint EC2) which is normally used under normal operating conditions, and performs fuel injection and ignition at the medium operating angle setting D2.

In that situation, the drive of crankshaft 07 by drive motor 09 results in a slow rise of the rotational speed of crankshaft 07. If the valve operating angle D of exhaust valve 5 is controlled to the large operating angle setting D3 (EO3, EC3) under this condition, the significantly advanced exhaust valve opening timing EO at the exhaust valve opening timing setpoint EO3 may cause a decrease in the engine torque, and the significantly retarded exhaust valve closing timing EC at the exhaust valve closing timing setpoint EC3 causes an excessive amount of exhaust gas to remain in the cylinder through the period of large valve overlap O/L, because the rotational speed of crankshaft 07 is insufficient. This may cause the engine to be unstable or to stall. In view of the foregoing, in the case of normal engine start, the valve operating angle D of exhaust valve 5 is set to the standard medium operating angle setting D2 (EO2, EC2).

Conversely in the special process of the present embodiment, since the rotational speed of crankshaft 07 is quickly increased by the combustion-based cranking engine start, the large operating angle setting D3 (EO3, EC3) can be used in early timing after the engine cranking. This feature serves to achieve sufficient heating and activation of the catalyst and return of highly concentrated hydrocarbons to the intake side, and thereby achieve reduction of emissions, and enhance the fuel efficiency.

Incidentally, the quick rise of engine speed is prevented from leading to abnormal high-speed idling, because of the advance control of exhaust valve opening timing EO and the increase of the valve overlap O/L in the later half of the operation as described above.

At Step S17, controller 22 measures the crankshaft gross rotation angle θ by crank angle sensor 010. Then, at Step S18, controller 22 determines whether or not the crankshaft gross rotation angle θ is greater than or equal to θ0. When the answer to step S18 is YES, then controller 22 determines that the combustion process becomes stable and proceeds to Step S19. On the other hand, when the answer to step S18 is NO, then controller 22 returns to Step S15. At Step S19, controller 22 stops energizing the drive motor 09.

After Step S19, the rotation of the engine is maintained by series of combustion events. At Step S20, controller 22 measures engine temperature T. At Step S21, controller 22 determines whether or not engine temperature T is greater than or equal to a predetermined reference value T0. When the answer to step S21 is NO, then controller 22 returns to Step S20. On the other hand, when the answer to step S21 is YES, then controller 22 returns from this control process.

The following describes a control method for controlling the exhaust valve opening timing EO, exhaust valve closing timing EC, intake valve opening timing IO, and intake valve closing timing IC according to the second embodiment. This control method is based on operation of the exhaust VTC 2 and intake VTC 3 for controlling the exhaust valve opening timing EO of exhaust valve 5 and the valve overlap O/L. The exhaust VEL 1 may be replaced with a conventional type by which the valve operating angle D and valve lift L of exhaust valve 5 is constant.

Figure 13:
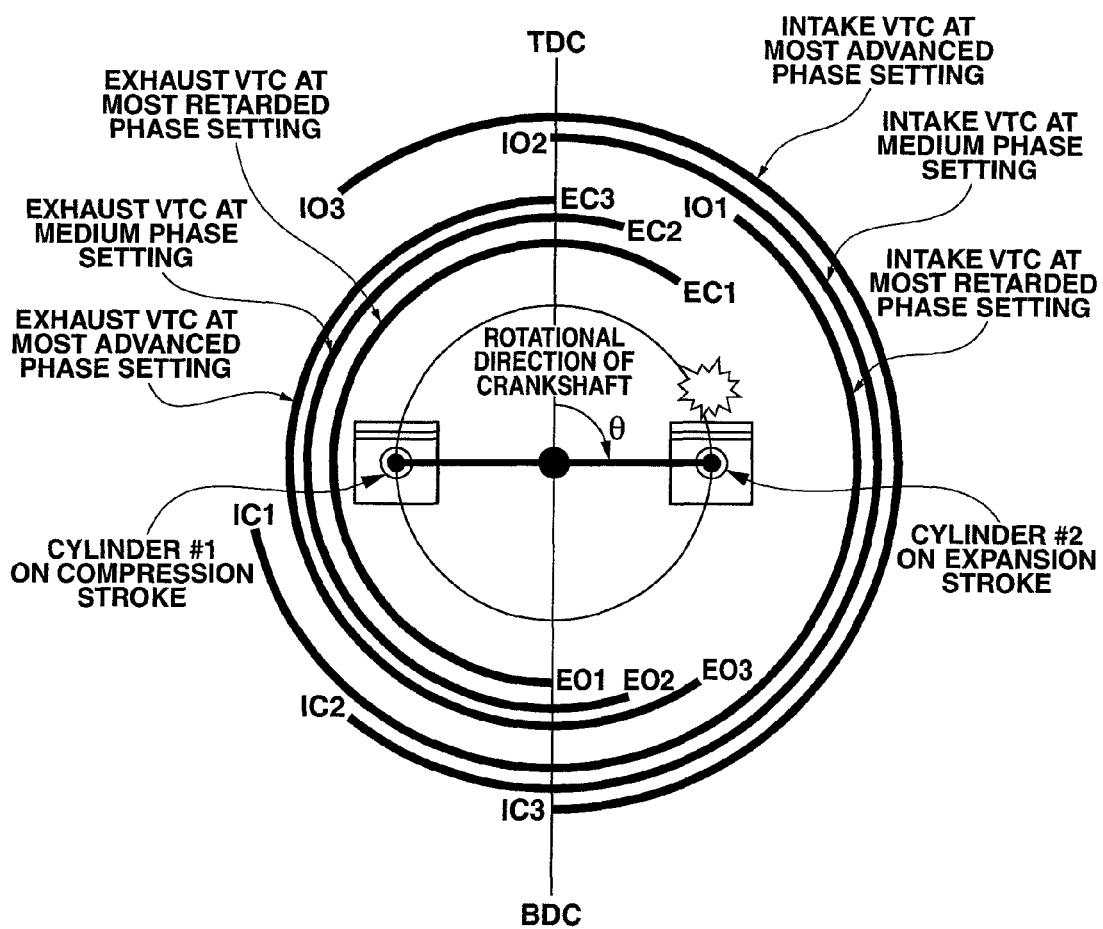
FIG. 13 is a schematic diagram showing settings of exhaust valve opening timing and exhaust valve closing timing by an exhaust valve timing varying mechanism, and settings of intake valve opening timing and intake valve closing timing by an intake valve timing varying mechanism, wherein the exhaust valve timing varying mechanism and intake valve timing varying mechanism constitute a variable valve actuating system according to a second embodiment of the present invention.

FIG. 13 shows settings of valve opening timing and valve closing timing of intake valves 4, 4 and exhaust valves 5, 5. The exhaust valve opening timing EO and exhaust valve closing timing EC of exhaust valves 5 are controlled by the exhaust VTC 2, whereas the intake valve opening timing IO and intake valve closing timing IC of intake valves 4 are controlled by the inactive intake VTC 3.

When the exhaust VTC 2 is in the operating position for the most retarded setting, the exhaust valve opening timing EO and exhaust valve closing timing EC of exhaust valve 5 are at exhaust valve opening timing setpoint EO1 and exhaust valve closing timing setpoint EC1, respectively as shown in FIG. 13. When the exhaust VTC 2 is in the operating position for the medium timing setting, the exhaust valve opening timing EO and exhaust valve closing timing EC are at exhaust valve opening timing setpoint EO2 and exhaust valve closing timing setpoint EC2, respectively. When the exhaust VTC 2 is in the operating position for the most advanced setting, the exhaust valve opening timing EO and exhaust valve closing timing EC are at exhaust valve opening timing setpoint EO3 and exhaust valve closing timing setpoint EC3, respectively. When the intake VTC 3 is in the operating position for the most retarded setting, the intake valve opening timing IO and intake valve closing timing IC of intake valve 4 are at the intake valve opening timing setpoint IO1 and intake valve closing timing setpoint IC1, respectively as shown in FIG. 13. When the intake VTC 3 is in the operating position for the medium timing setting, the intake valve opening timing IO and intake valve closing timing IC are at the intake valve opening timing setpoint IO2 and intake valve closing timing setpoint IC2, respectively. When the intake VTC 3 is in the operating position for the most advanced setting, the intake valve opening timing IO and intake valve closing timing IC are at the intake valve opening timing setpoint IO3 and intake valve closing timing setpoint IC3.

As the exhaust VTC 2 and intake VTC 3 are controlled toward the advance side, the valve overlap O/L gradually increases, because the phase change of the intake VTC 3 is set larger than that of the exhaust VTC 2.

Figure 14:
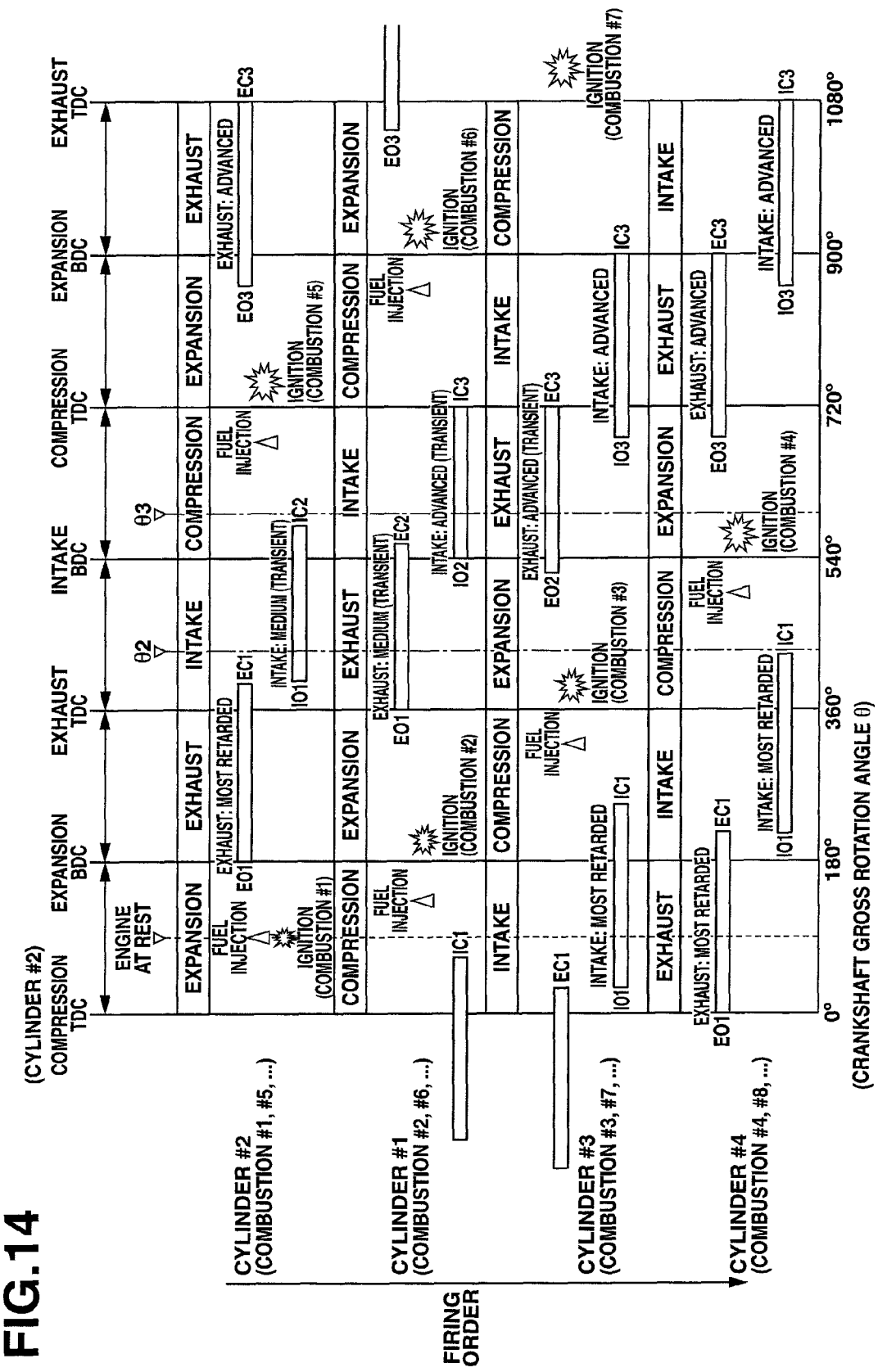
FIG. 14 is a diagram illustrating a sequence of engine startup in which valve operation of each cylinder is controlled by the variable valve actuating system according to the second embodiment.

FIG. 14 illustrates a sequence of engine startup in which valve operation of each cylinder of the four-cylinder internal combustion engine is controlled by the variable valve actuating system according to the second embodiment, similar to FIG. 10. This sequence is based on assumption that when the engine is at rest, namely, before the engine start control is started, cylinder #2 is at rest on expansion stroke, where the firing order is the same as in the first embodiment.

The control of exhaust valve opening timing EO and the control of the valve overlap O/L are similar as in the first embodiment, but are implemented by a different manner as detailed below. The horizontal axis of the diagram of FIG. 14 indicates a crankshaft gross rotation angle θ which is measured with respect to the last compression top dead center of cylinder #2 when the engine is at rest. From top to bottom in the vertical axis of the diagram of FIG. 14, the four cylinders are arranged in the firing order of cylinder #2, cylinder #1, cylinder #3 and cylinder #4.

When the engine is at rest, the crankshaft gross rotation angle θ is at or close to 90 degrees. Immediately after the engine is stopped, air flows into each cylinder through the opened intake valves 4, 4 or exhaust valves 5, 5 in the cases of cylinder #3 and cylinder #4 and through the clearance between the periphery of piston 03 and the wall of the cylinder bore in the cases of cylinder #2 and cylinder #1 whose intake valves 4 and exhaust valves 5, 5 are closed, so that the internal pressure of each cylinder becomes substantially equal to the atmospheric pressure.

When a predetermined requirement is satisfied for restart of the engine, controller 22 starts to perform a combustion-based cranking engine start in which fuel injection and ignition is performed in cylinder #2 so that combustion pressure causes crankshaft 07 to start to rotate with no external crank torque other than the crank torque based on the combustion pressure. The combustion pressure produced by the initial combustion event is low in general, because the incylinder volumetric capacity of cylinder #2 is only substantially half the displacement per cylinder, and the incylinder pressure is equal to about the atmospheric pressure. Accordingly, it is generally difficult to rotate crankshaft 07 against a reaction force from the piston 03 of the second combustion cylinder (cylinder #1) due to compression, etc.

This embodiment addresses the problem about engine start described above generally by causing the exhaust valve opening timing EO of exhaust valve 5 to retard toward bottom dead center as shown in FIG. 9 by placing the exhaust VTC 2 in the most retarded position as a default position. This feature results in delaying the timing combustion pressure falls due to flow-out of exhaust gas, namely, extending the effective expansion stroke, and efficiently convert the relatively low combustion pressure into a crank torque for cranking the crankshaft 07. This allows rotation of crankshaft 07 to be quickly accelerated, and allows the piston of the second combustion cylinder (cylinder #1) to pass through the compression top dead center.

On the other hand, the exhaust valve closing timing EC is most retarded to exhaust valve closing timing setpoint EC1, later than top dead center.

On the other hand, the intake VTC 3 is also in the most retarded position as a default position, where the amount of retard of intake valve opening timing IO of intake valve 4 to intake valve opening timing setpoint IO1 is larger than the amount of retard of exhaust valve closing timing EC to exhaust valve closing timing setpoint EC1. Accordingly, the valve overlap O/L between the exhaust valve closing timing EC (exhaust valve closing timing setpoint EC1) and the next intake valve opening timing IO of intake valve 4 (intake valve opening timing setpoint IO1) is small, or zero or negative. The feature that the valve overlap O/L is small or zero produces the advantageous effect of promoting initial heating and activation of the catalyst as in the first embodiment.

The following describes the initial combustion event of the second combustion cylinder (cylinder #1). In the second combustion event, the compression pressure is higher (about 5 atmospheric pressure at compression of an effective compression ratio of 5), and the combustion pressure higher than in the first combustion event of cylinder #2, as in the first embodiment. However, the second combustion event is still unstable. In consideration of this fact, the exhaust valve closing timing EC of exhaust valve 5 is maintained at exhaust valve closing timing setpoint EC1 as in the first combustion event, as shown in FIG. 14. This feature serves to efficiently convert the insufficient combustion pressure into a crank torque to rotate the crankshaft 07, and thereby further promotes quick rise of rotation of crankshaft 07.

Then, when the crankshaft gross rotation angle θ reaches an angle θ2 at or close to the center between 360 degrees and 540 degrees (just after the intake valve closing timing setpoint IC1 of the fourth combustion cylinder (cylinder #4)), controller 22 sends to the exhaust VTC 2 and intake VTC 3 control signals for setting the valve operation timing to intermediate settings. Accordingly, the exhaust valve closing timing EC of exhaust valve 5 is controlled to retard to the exhaust valve closing timing setpoint EC2, whereas the intake valve opening timing IO and intake valve closing timing IC are controlled to the intake valve opening timing setpoint IO2 and intake valve closing timing setpoint IC2. In this way, in the second combustion event, the exhaust valve opening timing EO is maintained at the exhaust valve opening timing setpoint EO1, whereas the exhaust valve closing timing EC is dynamically changed to the exhaust valve closing timing setpoint EC2.

The retard control to the exhaust valve closing timing setpoint EC2 produces a medium valve overlap O/L between the exhaust valve closing timing setpoint EC2 and the intake valve opening timing setpoint IO2. This feature serves to return to the intake side not to the exhaust side some amount of exhaust gas which contains highly-concentrated hydrocarbons HC which are pulled up by the piston immediately before the end of the exhaust stroke. The returned amount of exhaust gas containing highly-concentrated hydrocarbons is burned again in the next combustion event (combustion #6), so that the amount of hydrocarbon emissions is reduced.

On the other hand, the return of exhaust gas by the medium valve overlap O/L results in a reduction in the quantity of exhaust gas flowing into the catalyst in the downstream side of the exhaust pipe. However, the warming-up by the first combustion event of cylinder #2 is still effective, and the reduction of hydrocarbon emissions in the exhaust gas containing highly-concentrated hydrocarbons serves to reduce the amount of hydrocarbon emissions, so that the amount of hydrocarbon emissions is reduced totally. The setting to the medium valve overlap O/L may be replaced with continuation of the small valve overlap O/L and exhaust valve closing timing setpoint EC1 and intake valve opening timing setpoint IO1, for increasing the amount of exhaust gas flowing into the catalyst and thereby enhancing activation of the catalyst in the initial stage.

The following describes the initial combustion event of the third combustion cylinder (cylinder #3), i.e., the third combustion event of the engine. The incylinder pressure of cylinder #3 in the third combustion event is higher than in the first combustion event in cylinder #2 and the second combustion event in cylinder #1. Moreover, the amount of exhaust gas is larger than in the first combustion event and the second combustion event. This supplies a higher torque driving the crankshaft 07, and allows the exhaust valve opening timing EO of exhaust valve 5 to retard to exhaust valve opening timing setpoint EO2 so that a large amount of exhaust gas at high temperature can be supplied to the exhaust catalyst. This serves to further activate the catalyst by heating, and thereby effectively purify the increased amount of exhaust gas (the amount of emissions).

The change of the exhaust valve opening timing EO to the exhaust valve opening timing setpoint EO2 is in response to a control signal from controller 22 to the exhaust VTC 2 which is outputted at the time of angle θ2.

Thereafter, when the crankshaft gross rotation angle θ reaches an angle θ3 immediately after the intake valve closing timing setpoint IC2 of the first combustion cylinder (cylinder #2), controller 22 outputs to the exhaust VTC 2 and intake VTC 3 control signals for setting the valve operating timing most advanced. Accordingly, the exhaust valve closing timing EC is advanced to exhaust valve closing timing setpoint EC3, whereas the exhaust valve opening timing EO is at exhaust valve opening timing setpoint EO2. On the other hand, the intake valve opening timing IO and intake valve closing timing IC of intake valve 4 are advanced more to intake valve opening timing setpoint IO3 and intake valve closing timing setpoint IC3. As a result, the valve overlap O/L in the third combustion event is relatively large between exhaust valve closing timing setpoint EC3 and intake valve opening timing setpoint IO3.

This feature serves to return to the intake side not to the exhaust side some amount of exhaust gas which contains highly-concentrated hydrocarbons HC which are pulled up by the piston immediately before the end of the exhaust stroke. The returned amount of exhaust gas containing highly-concentrated hydrocarbons is burned again in the next combustion event (combustion #7), so that the amount of hydrocarbon emissions exhausted from the cylinder to the catalyst is reduced. This effect and the effect of catalyst activation by the advance of exhaust valve opening timing EO to exhaust valve opening timing setpoint EO2 serve to reduce emissions totally. The increase in valve overlap O/L also serves to reduce the pump loss significantly, and thereby enhance the fuel efficiency.

The following describes the initial combustion event of the fourth combustion cylinder (cylinder #4), i.e., the fourth combustion event of the engine. When the engine is at rest and the crankshaft gross rotation angle θ is equal to 90 degrees, cylinder #4 is on the exhaust stroke. After the engine is started so that crankshaft 07 rotates and the piston 03 of cylinder #4 moves up to top dead center, air is exhausted out of the cylinder through the exhaust valves 5, 5. Then, cylinder #4 shifts from the exhaust stroke to the intake stroke so that the full stroke of the piston from the neighborhood of top dead center serves to intake a maximum amount of air. The amount of intake air is larger than in the third combustion event. This large amount of air and the full stroke of compression serve to further increase the combustion pressure and the amount of exhaust gas.

In the fourth combustion event, the exhaust valve opening timing EO and exhaust valve closing timing EC of exhaust valve 5 are at the exhaust valve opening timing setpoint EO3 and exhaust valve closing timing setpoint EC3, both of which are after angle θ3. The sufficiently advanced exhaust valve opening timing EO at the exhaust valve opening timing setpoint EO3 allows a large amount of exhaust gas at high temperature to be supplied to the exhaust catalyst. This serves to further activate the catalyst by heating. As in the third combustion event, the valve overlap O/L in the fourth combustion event is relatively large between the exhaust valve closing timing setpoint EC3 and intake valve opening timing setpoint IO3. This feature serves to return to the intake side not to the exhaust side some amount of exhaust gas which contains highly-concentrated hydrocarbons HC which are pulled up by the piston immediately before the end of the exhaust stroke. The returned amount of exhaust gas containing highly-concentrated hydrocarbons is burned again in the next combustion event (combustion #8), so that the amount of hydrocarbon emissions exhausted from the cylinder to the catalyst is reduced. This effect and the effect of catalyst activation by the advance of exhaust valve opening timing EO to exhaust valve opening timing setpoint EO3 serve to enhance the exhaust emission reduction performance. The increase in valve overlap O/L also serves to reduce the pump loss significantly, and thereby enhance the fuel efficiency.

The advance to exhaust valve opening timing setpoint EO2 in the third combustion event and the further advance to exhaust valve opening timing setpoint EO3 in the fourth combustion event serve to allow exhaust gas to escape from the cylinder through exhaust valves 5, 5 in early timing, and thereby prevent undesirable engine speed rise at the later stage which tends to result from the quick engine start based on the combustion-based cranking, as in the first embodiment.

After the first combustion event, the valve overlap O/L is gradually increased through the medium setting to the large setting. This feature serves to enhance the concentration of exhaust gas in the intake air in or after the sixth combustion event, and thereby suppress the combustion torque from suddenly increasing, and suppress the engine rotation from abnormally increasing.

As described above, the second embodiment produces similar advantageous effects as shown in FIG. 11 in the first embodiment.

The feature that the intake valve closing timing IC of the fourth combustion cylinder immediately before ignition and combustion is set to the most retarded point as shown in FIG. 14, serves to prevent intake of an excess amount of air, and thereby prevent high-speed idling phenomena more effectively than in the first embodiment, while enhancing the air charging efficiency and complete explosion performance.

Figure 15:
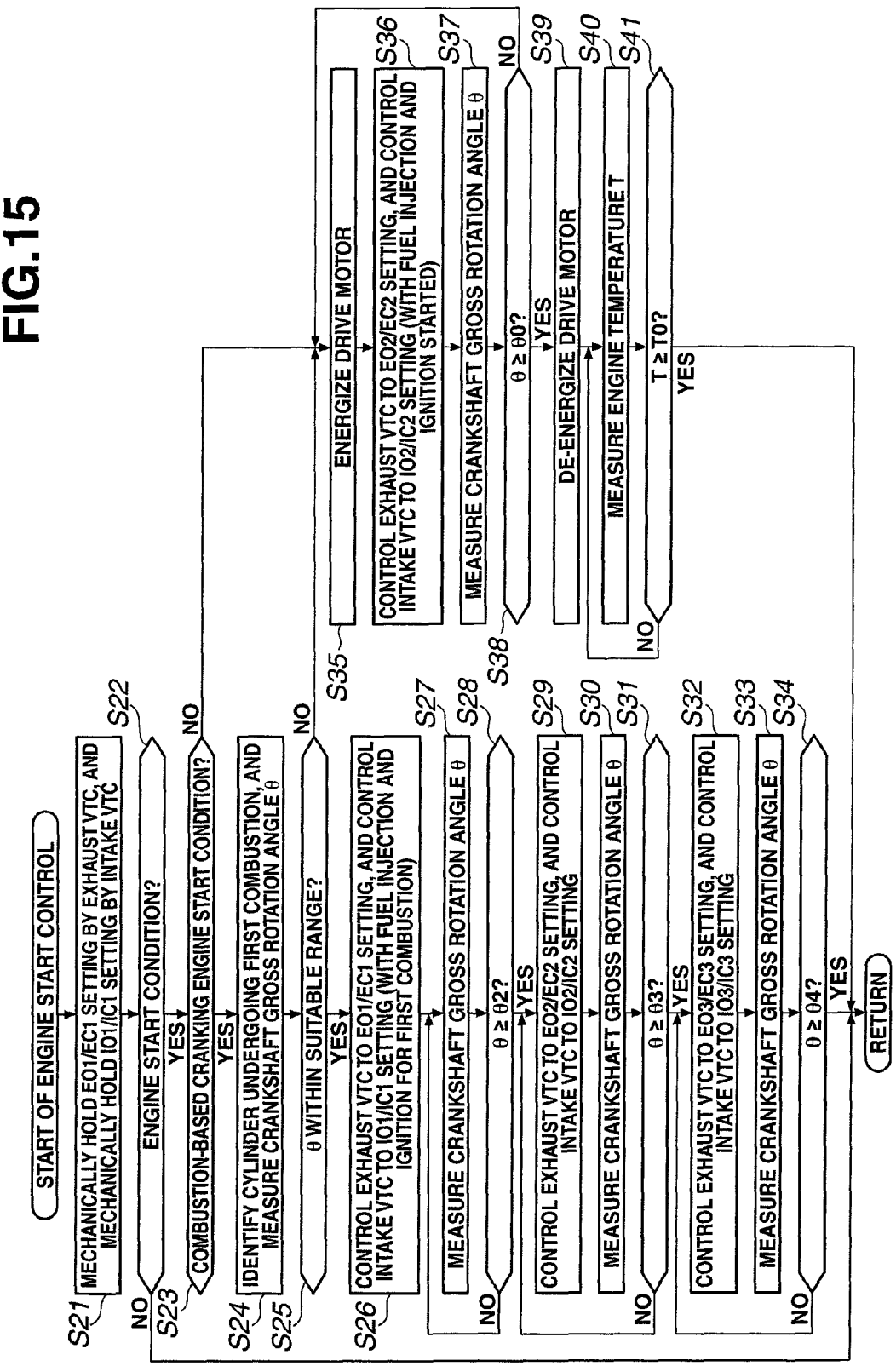
FIG. 15 is a flow chart showing a control process performed by a controller of the variable valve actuating system according to the second embodiment.

FIG. 15 is a flow chart showing a control process performed by controller 22 of the variable valve actuating system according to the second embodiment.

At Step S21, controller 22 allows the exhaust VTC 2 to mechanically hold the exhaust valve opening timing EO and exhaust valve closing timing EC at the exhaust valve opening timing setpoint EO1 and exhaust valve closing timing setpoint EC1 as default settings by the biasing force of coil springs 55, 56. Simultaneously, controller 22 allows the intake VTC 3 to mechanically hold the intake valve opening timing IO and intake valve closing timing IC of intake valve 4 to the intake valve opening timing setpoint IO1 and intake valve closing timing setpoint IC1 by the biasing force of coil springs.

At Step S22, controller 22 determines whether or a predetermined engine start condition is satisfied. When the answer to step S22 is NO, then controller 22 returns from this control process. On the other hand, when the answer to step S22 is YES, then controller 22 proceeds to Step S23.

At Step S23, controller 22 determines whether or a predetermined combustion-based cranking engine start condition is satisfied. When the answer to step S23 is NO, then controller 22 proceeds to Step S35. On the other hand, when the answer to step S23 is YES, then controller 22 proceeds to Step S24. When engine temperature T is below a predetermined reference level, controller 22 determines that the predetermined combustion-based cranking engine start condition is unsatisfied. On the other hand, when engine temperature T is above the predetermined reference level, controller 22 determines that the predetermined combustion-based cranking engine start condition is satisfied.

At Step S24, controller 22 identifies the first combustion cylinder that is on the expansion stroke, with reference to the crank angle measured by crank angle sensor 010. Then, controller 22 identifies the compression top dead center of the first combustion cylinder, and sets the crankshaft gross rotation angle θ with respect to the compression top dead center.

At Step S25, controller 22 determines whether or not the crankshaft gross rotation angle θ is within a predetermined suitable range θ1 from 90 degrees (for example, 60 to 120 degrees). When the answer to step S25 is NO, then controller 22 determines that it is difficult to perform reliable combustion-based cranking operation, and proceeds to Step S35. On the other hand, when the answer to step S25 is YES, then controller 22 proceeds to Step S26.

At Step S26, controller 22 starts combustion-based cranking operation. Controller 22 outputs to the exhaust VTC 2 a control signal for setting the exhaust valve opening timing EO and exhaust valve closing timing EC to the exhaust valve opening timing setpoint EO1 and exhaust valve closing timing setpoint EC1 (most retarded condition), and outputs to the intake VTC 3 a control signal for setting the intake valve opening timing IO and intake valve closing timing IC to the intake valve opening timing setpoint IO1 and intake valve closing timing setpoint IC1 (most retarded condition), in consideration that start of rotation of crankshaft 07 may cause fluctuations in the load applied to control shaft 17, although the exhaust VTC 2 mechanically holds the exhaust valve opening timing EO and exhaust valve closing timing EC to the exhaust valve opening timing setpoint EO1 and exhaust valve closing timing setpoint EC1 and the intake VTC 3 mechanically holds the intake valve opening timing IO and intake valve closing timing IC to the intake valve opening timing setpoint IO1 and intake valve closing timing setpoint IC1 when the engine is at rest. Under that condition, controller 22 performs a combustion control of injecting fuel in the first combustion cylinder (cylinder #2) and igniting. Accordingly, crankshaft 07 starts to be rotated where the exhaust valve opening timing EO is set to the exhaust valve opening timing setpoint EO1 in the first combustion cylinder (cylinder #2).

In the first combustion cylinder (cylinder #2), the small valve overlap O/L by the advance of the exhaust valve closing timing EC to exhaust valve closing timing setpoint EC1 serves to promote initial temperature rise and activation of the catalyst.

At Step S27, controller 22 measures the crankshaft gross rotation angle θ by crank angle sensor 010. Then, at Step S28, controller 22 determines whether or not the crankshaft gross rotation angle θ is greater than or equal to θ2. When the answer to step S28 is YES, then controller 22 proceeds to Step S29. On the other hand, when the answer to step S28 is NO, then controller 22 returns to Step S27. At Step S29, controller 22 controls the exhaust VTC 2 and intake VTC 3 to the medium phase settings (EO2/EC2, IO2/IC2). Accordingly, the valve overlap O/L after the second combustion event in the second combustion cylinder (cylinder #1) is slightly increased so as to return to the intake side not to the exhaust side the portion of exhaust gas containing high concentration hydrocarbons at the end of the exhaust stroke due to the increase of exhaust gas, and thereby reduce the amount of hydrocarbon emissions.

The exhaust valve opening timing EO of exhaust valve 5 at the moment when exhaust valve 5 opens is still at the most retarded exhaust valve opening timing setpoint EO1, so that the rotational speed of crankshaft 07 is increased as in the first combustion cylinder (cylinder #2).

At Step S30, controller 22 measures the crankshaft gross rotation angle θ by crank angle sensor 010. Then, at Step S31, controller 22 determines whether or not the crankshaft gross rotation angle θ is greater than or equal to θ3. When the answer to step S31 is YES, then controller 22 proceeds to Step S32. On the other hand, when the answer to step S31 is NO, then controller 22 returns to Step S29. At Step S32, controller 22 allows the exhaust VTC 2 to set the operating timing of exhaust valve 5 to the most advanced setting of the exhaust valve opening timing setpoint EO3 and exhaust valve closing timing setpoint EC3, and allows the intake VTC 3 to set the operating timing of intake valve 4 to the most advanced setting of intake valve opening timing setpoint IO3 and intake valve closing timing setpoint IC3. Accordingly, the valve overlap O/L after the third combustion event in the third combustion cylinder (cylinder #3) is further increased so as to return to the intake side not to the exhaust side the portion of exhaust gas containing high concentration hydrocarbons at the end of the exhaust stroke due to the increase of exhaust gas, and thereby reduce the amount of hydrocarbon emissions.

The exhaust valve opening timing EO of exhaust valve 5 at the moment when exhaust valve 5 opens is still at the intermediate timing setting so that the exhaust valve opening timing EO is at the slightly advanced exhaust valve opening timing setpoint EO2, and exhaust gas still at high temperature is supplied to the catalyst. This serves to heat and activate the catalyst, and thereby purify the increased amount of exhaust gas emissions effectively, and enhance the fuel efficiency as in the first embodiment.

Regarding the fourth combustion cylinder (cylinder #4), the valve overlap O/L after the fourth combustion event is increased as in the third combustion cylinder (cylinder #3) so as to return to the intake side not to the exhaust side the portion of exhaust gas containing high concentration hydrocarbons at the end of the exhaust stroke due to the increase of exhaust gas, and thereby reduce the amount of hydrocarbon emissions.

At this moment, the exhaust valve opening timing EO of exhaust valve 5 is at the significantly advanced exhaust valve opening timing setpoint EO3, and a large amount of exhaust gas at further high temperature is supplied to the catalyst. This serves to heat and activate the catalyst, and thereby purify the increased amount of exhaust gas emissions effectively, and enhance the fuel efficiency as in the first embodiment.

At Step S33, controller 22 measures the crankshaft gross rotation angle θ by crank angle sensor 010. Then, at Step S34, controller 22 determines whether or not the crankshaft gross rotation angle θ is greater than or equal to θ4. When the answer to step S34 is YES, then controller 22 returns from this control process. On the other hand, when the answer to step S34 is NO, then controller 22 returns to Step S32.

After return from the control process shown in FIG. 15, controller 22 controls the exhaust VTC 2 and intake VTC 3 according to the engine operating state with reference to their respective operation maps, so that the operating timing of intake valve 4 and exhaust valve 5 varies between the most advanced point and the most retarded point.

In this way, engine start is implemented by combustion-based cranking operation, with which engine speed can be quickly increased with low emissions and high fuel efficiency. Owing to the retard control for the intake valve closing timing IC and the advance control for the exhaust valve opening timing EO and the increase control for valve overlap O/L, the quick increase of engine speed is prevented from being accompanied by phenomenon of excessive rise of engine speed.

At Step S35, which follows the negative answer at Step S23 or S25, controller 22 selects normal engine start instead of combustion-based cranking engine start so that the cranking operation starts to be implemented by drive motor 09. Then, at Step S36, controller 22 sets the valve operating timing to exhaust valve opening timing setpoint EO2, exhaust valve closing timing setpoint EC2, intake valve opening timing setpoint IO2 and intake valve closing timing setpoint IC2, which is used under normal conditions, and perform fuel injection and ignition at those settings.

In this situation, the drive of crankshaft 07 by drive motor 09 results in a slow rise of the rotational speed of crankshaft 07. If the valve operating timings of exhaust valve 5 and intake valve 4 are controlled to the most advanced settings (EO3, EC3, IO3, IC3) under this condition, the significantly advanced exhaust valve opening timing EO at the exhaust valve opening timing setpoint EO3 may cause a decrease in the engine torque, and the long period of valve overlap O/L may cause an excessive amount of exhaust gas to remain in the cylinder. This may cause the engine to be unstable or to stall. In view of the foregoing, in the case of normal engine start, the valve operating timings of exhaust valve 5 and intake valve 4 are controlled to the medium settings (EO2, EC2, IO2, IC2). Conversely in the special process of this embodiment, since the rotational speed of crankshaft 07 is quickly increased by the combustion-based cranking engine start, the most advanced settings (EO3, EC3, IO3, IC3) can be used in early timing after the engine cranking. This feature serves to achieve sufficient heating and activation of the catalyst and return of highly concentrated hydrocarbons to the intake side, and thereby achieve reduction of emissions, and enhance the fuel efficiency as in the first embodiment.

At Steps S37 to S41, controller 22 operates in the same manner as at Steps S17 to 21 in FIG. 12 in the first embodiment.

The present embodiments may be modified, for example, as follows. The exhaust VTC 2 and intake VTC 3 are based on the hydraulic drive system but may be based on an electric drive system. The employment of such an electric drive system is advantageous in enhancing the response in the early stage of engine start, and thereby serving to contribute to further quick engine start. Since such an electric drive system is capable of working even when the engine is at rest, the electric drive system may be used to accurately set the valve operating timing for the initial condition of engine start.

The variable valve actuating system is applied to the common vehicle engine, but may be applied to an engine for a hybrid electric vehicle. In such a case, the variable valve actuating system is advantageous, for example, when rapid acceleration is started by shifting from an electric-motor drive mode, in which an internal combustion engine is at rest, to a hybrid drive mode in which the internal combustion engine is active. For this shifting, engine start may be implemented by the combustion-based cranking engine start, which reduces the load needed to generate a cranking torque and applied to the electric motor, and achieves high acceleration performance with no temporary fall in the vehicle driving torque at the time of engine start.

The engine in the shown embodiments is a four cylinder engine provided with no device for controlling the position of crankshaft 07 when the engine is at rest. However, drive motor 09 may be used for implementing a function of controlling the crankshaft gross rotation angle θ precisely at or near 90 degrees when the engine is at rest, which serves to further stabilize the engine startability. The four cylinders may be replaced with three cylinders with which the cylinder interval is equal to 240 degrees not 180 degrees for four cylinders. In the case of three cylinders, the crankshaft gross rotation angle θ when the engine is at rest is set to about 120 degrees instead of 90 degrees. Otherwise, the crankshaft gross rotation angle θ may be set by the crankshaft position control means at or near 90 degrees as in the present embodiments. This technique may be applied to two-cylinder engines. Namely, the variable valve actuating system according to the present embodiments may be applied to internal combustion engines equipped with two or more cylinders.

In the present embodiments, the valve opening timing EO, IO and valve closing timing EC, IC mean exact timings of beginning and end of a period in which the valve is open. However, the valve opening timing EO, IO and valve closing timing EC, IC may be defined to mean a time instant when the valve has been lifted slightly at the beginning of the operating period, which is a start of substantial or effective intake or exhaust, and a time instant just before the valve has been closed at the end of the operating period, which is an end of substantial or effective intake or exhaust, respectively. This modification serves to enhance the advantageous effects produced by the present embodiments.

The entire contents of Japanese Patent Application 2011-094705 filed Apr. 21, 2011 are incorporated herein by reference.

Although the invention has been described above by reference to certain embodiments of the invention, the invention is not limited to the embodiments described above. Modifications and variations of the embodiments described above will occur to those skilled in the art in light of the above teachings. The scope of the invention is defined with reference to the following claims.

What is claimed is:

1. A controller for controlling a variable valve actuating apparatus for a multi-cylinder internal combustion engine, wherein the engine includes at least a first cylinder and a second cylinder, the controller comprising:
    a section programmed to perform a control process in response to a precondition that the first cylinder undergoes an initial combustion event at a startup of the engine earlier than any other cylinder of the engine, the control process including:
    a first operation of setting an exhaust valve opening timing of the first cylinder to a most retarded position toward bottom dead center, wherein the exhaust valve opening timing is an initial one immediately after the initial combustion event of the first cylinder; and
    a second operation of setting a second valve overlap period greater than a first valve overlap period, wherein the first valve overlap period is a period from an initial intake valve opening timing of the first cylinder to an initial exhaust valve closing timing of the first cylinder immediately after the initial combustion event of the first cylinder, and wherein the second valve overlap period is a period from an initial intake valve opening timing of the second cylinder to an initial exhaust valve closing timing of the second cylinder immediately after an initial combustion event of the second cylinder after the initial combustion event of the first cylinder.

2. The controller as claimed in claim 1, wherein the second operation includes setting the initial exhaust valve closing timing of the first cylinder a most retarded position toward top dead center.

3. The controller as claimed in claim 2, wherein the second operation includes setting the first valve overlap period to substantially zero or negative.

4. The controller as claimed in claim 1, wherein:
the precondition is a condition where the initial combustion event of the second cylinder is immediately subsequent to the initial combustion event of the first cylinder without any other combustion event therebetween; and
the control process includes setting an exhaust valve opening timing of the second cylinder to a most retarded position toward bottom dead center, wherein the exhaust valve opening timing of the second cylinder is an initial one immediately after the initial combustion event of the second cylinder.

5. The controller as claimed in claim 1, wherein:
the engine includes a third cylinder;
the precondition is a condition where the third cylinder undergoes an initial combustion event earlier than the second cylinder and later than the first cylinder; and
the control process includes setting an exhaust valve opening timing of the third cylinder to a most retarded position toward bottom dead center, wherein the exhaust valve opening timing of the third cylinder is an initial one immediately after the initial combustion event of the third cylinder.

6. The controller as claimed in claim 5, wherein the control process includes a third operation of setting a third valve overlap period greater than the first valve overlap period, wherein the third valve overlap period is a period from an initial intake valve opening timing of the third cylinder to an initial exhaust valve closing timing of the third cylinder immediately after the initial combustion event of the third cylinder.

7. The controller as claimed in claim 4, wherein the control process includes setting a second valve working angle greater than a first valve working angle, wherein the first valve working angle is an angle from the initial exhaust valve opening timing of the first cylinder to the initial exhaust valve closing timing of the first cylinder, and wherein the second valve working angle is a period from the initial exhaust valve opening timing of the second cylinder to the initial exhaust valve closing timing of the second cylinder.

8. The controller as claimed in claim 7, wherein the section is programmed to implement the setting of the second valve working angle by increasing the second valve working angle during a period from the initial exhaust valve opening timing of the second cylinder to the initial exhaust valve closing timing of the second cylinder.

9. The controller as claimed in claim 4, wherein:
the engine includes a third cylinder;
the precondition is a condition where the third cylinder undergoes an initial combustion event later than the second cylinder; and
the control process includes setting an exhaust valve opening timing of the third cylinder to be advanced from bottom dead center, wherein the exhaust valve opening timing of the third cylinder is an initial one immediately after the initial combustion event of the third cylinder.

10. The controller as claimed in claim 4, wherein:
the engine includes a third cylinder;
the precondition is a condition where the third cylinder undergoes an initial combustion event later than the second cylinder; and
the control process includes setting a third valve overlap period greater than the second valve overlap period, wherein the third valve overlap period is a period from an initial intake valve opening timing of the third cylinder to an initial exhaust valve closing timing of the third cylinder immediately after the initial combustion event of the third cylinder after the initial combustion event of the second cylinder.

11. The controller as claimed in claim 10, wherein the control process includes setting a third valve working angle greater than a second valve working angle, wherein the second valve working angle is an angle from the initial exhaust valve opening timing of the second cylinder to the initial exhaust valve closing timing of the second cylinder, and wherein the third valve working angle is a period from an initial exhaust valve opening timing of the third cylinder to the initial exhaust valve closing timing of the third cylinder immediately after the initial combustion event of the third cylinder.

12. The controller as claimed in claim 11, wherein the section is programmed to implement the setting of the third valve working angle by increasing the third valve working angle during a period from the initial exhaust valve opening timing of the third cylinder to the initial exhaust valve closing timing of the third cylinder.

13. The controller as claimed in claim 10, wherein:
the engine includes a fourth cylinder;
the precondition is a condition where the fourth cylinder undergoes an initial combustion event later than the third cylinder; and
the control process includes setting an exhaust valve opening timing of the fourth cylinder to be advanced more than an exhaust valve opening timing of the third cylinder, wherein the exhaust valve opening timing of the third cylinder is an initial one immediately after the initial combustion event of the third cylinder, and wherein the exhaust valve opening timing of the fourth cylinder is an initial one immediately after the initial combustion event of the fourth cylinder.

14. The controller as claimed in claim 13, wherein the control process includes setting a fourth valve working angle greater than a third valve working angle, wherein the third valve working angle is an angle from the initial exhaust valve opening timing of the third cylinder to the initial exhaust valve closing timing of the third cylinder, and wherein the fourth valve working angle is a period from the initial exhaust valve opening timing of the fourth cylinder to an initial exhaust valve closing timing of the fourth cylinder immediately after the initial combustion event of the fourth cylinder.

15. The controller as claimed in claim 14, wherein the section is programmed to implement the setting of the fourth valve working angle by increasing the fourth valve working angle during a period from the initial exhaust valve opening timing of the fourth cylinder to the initial exhaust valve closing timing of the fourth cylinder.

16. The controller as claimed in claim 1, wherein the section is programmed to perform the first operation when the first cylinder of the engine is idle at a predetermined rest position.

17. The controller as claimed in claim 1, wherein the section is programmed to cancel the control process in response to a condition that temperature of the engine is below a predetermined reference value.

18. The controller as claimed in claim 1, wherein the second operation includes changing the first valve overlap period at least by controlling the initial intake valve opening timing of the first cylinder.

19. The controller as claimed in claim 1, wherein the setting of the exhaust valve opening timing of the first cylinder to the most retarded position toward bottom dead center, is set at the bottom dead center.

20. A controller for controlling a variable valve actuating apparatus for a multi-cylinder internal combustion engine, wherein the engine includes at least a first cylinder and a second cylinder, the controller comprising:
- a section programmed to perform a control process in response to a precondition that the first cylinder undergoes an initial combustion event at a startup of the engine earlier than any other cylinder of the engine, the control process including:
- a first operation of retarding an exhaust valve opening timing of the first cylinder to a most retarded position toward bottom dead center, wherein the exhaust valve opening timing is an initial one immediately after the initial combustion event; and
- a second operation of allowing exhaust gas to flow into an intake-side part of the engine, wherein the exhaust gas is produced by an initial combustion event of the second cylinder after the initial combustion event of the first cylinder.

21. The controller as claimed in claim 20, wherein the retarding of the exhaust valve opening timing of the first cylinder to the most retarded position toward bottom dead center, is retarded to the bottom dead center.

22. A variable valve actuating apparatus for a multi-cylinder internal combustion engine, wherein the engine includes at least a first cylinder and a second cylinder, the variable valve actuating apparatus comprising:
- a section configured to perform a process in response to a precondition that the first cylinder undergoes an initial combustion event at a startup of the engine earlier than any other cylinder of the engine, the process including:
- a first operation of setting an exhaust valve opening timing of the first cylinder to a most retarded position toward bottom dead center, wherein the exhaust valve opening timing is an initial one immediately after the initial combustion event of the first cylinder; and
- a second operation of setting a second valve overlap period greater than a first valve overlap period, wherein the first valve overlap period is a period from an initial intake valve opening timing of the first cylinder to an initial exhaust valve closing timing of the first cylinder immediately after the initial combustion event of the first cylinder, and wherein the second valve overlap period is a period from an initial intake valve opening timing of the second cylinder to an initial exhaust valve closing timing of the second cylinder immediately after an initial combustion event of the second cylinder after the initial combustion event of the first cylinder.

23. The variable valve actuating apparatus as claimed in claim 22, wherein the startup of the engine is implemented by injecting fuel directly into a combustion chamber of each cylinder and igniting the injected fuel.

24. The variable valve actuating apparatus as claimed in claim 22, wherein the section is configured to maintain the exhaust valve opening timing of the first cylinder stably close to bottom dead center and maintain the exhaust valve closing timing of the first cylinder stably close to top dead center, when the first cylinder of the engine is idle at a predetermined rest position.

25. The variable valve actuating apparatus as claimed in claim 22, wherein the engine is automatically started and stopped independently of operator's operation.

26. The variable valve actuating apparatus as claimed in claim 22, wherein the section is configured to control characteristics of exhaust valve operation when the first cylinder of the engine is idle at a predetermined rest position.

27. The variable valve actuating apparatus as claimed in claim 22, wherein the setting of the exhaust valve opening timing of the first cylinder to the most retarded position toward bottom dead center, is set at the bottom dead center.

* * * * *